(12) United States Patent
Kanamori

(10) Patent No.: US 9,552,185 B2
(45) Date of Patent: Jan. 24, 2017

(54) INFORMATION PROCESSING APPARATUS WHICH STORES A SETTING STATE TO BE ACQUIRED BY A CLIENT APPARATUS

(71) Applicant: CANON KABUSHIKI KAISHA, Tokyo (JP)

(72) Inventor: Hideyuki Kanamori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/569,617

(22) Filed: Dec. 12, 2014

(65) Prior Publication Data
US 2015/0178031 A1    Jun. 25, 2015

(30) Foreign Application Priority Data

Dec. 25, 2013  (JP) .................................. 2013-268094

(51) Int. Cl.
    *G06F 3/12*    (2006.01)
(52) U.S. Cl.
    CPC ............ *G06F 3/1288* (2013.01); *G06F 3/1205* (2013.01); *G06F 3/1207* (2013.01); *G06F 3/1253* (2013.01); *G06F 3/1259* (2013.01); *G06F 3/1276* (2013.01)
(58) Field of Classification Search
    CPC .................................................... G06F 3/1288

USPC ................................................ 358/1.15, 1.14
See application file for complete search history.

(56) References Cited

U.S. PATENT DOCUMENTS

| 7,133,146 | B2 | 11/2006 | Kizawa | |
| 2009/0201540 | A1* | 8/2009 | Morooka | G06F 3/121 |
| | | | | 358/1.15 |
| 2012/0013948 | A1* | 1/2012 | Morooka | G06F 3/1203 |
| | | | | 358/1.15 |
| 2012/0026548 | A1* | 2/2012 | Nakagawa | G06F 3/1203 |
| | | | | 358/1.15 |
| 2012/0200877 | A1* | 8/2012 | Kanamori | 358/1.13 |

FOREIGN PATENT DOCUMENTS

JP         3431565 B      7/2003

* cited by examiner

*Primary Examiner* — Jacky X Zheng
(74) *Attorney, Agent, or Firm* — Fitzpatrick, Cella, Harper & Scinto

(57) ABSTRACT

When causing a printing apparatus to execute printing via a server apparatus, a print job is transmitted to the server apparatus. When acquiring a print setting set in the server apparatus or the printing apparatus, a setting job concerning the print setting is transmitted to the server apparatus. In accordance with transmission of the print job or the setting job, the status of printing by the printing apparatus based on the print job or the print setting corresponding to the setting job is acquired from the server apparatus as the status of the printing apparatus. The print environment of the server apparatus is determined based on the acquired status.

20 Claims, 21 Drawing Sheets

F I G. 2A
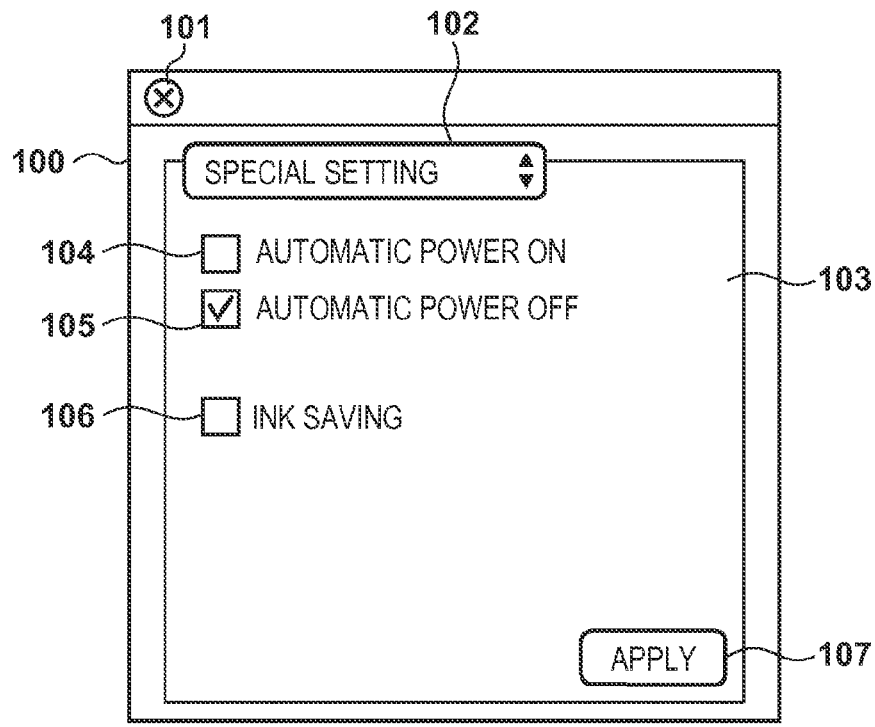
F I G. 2B
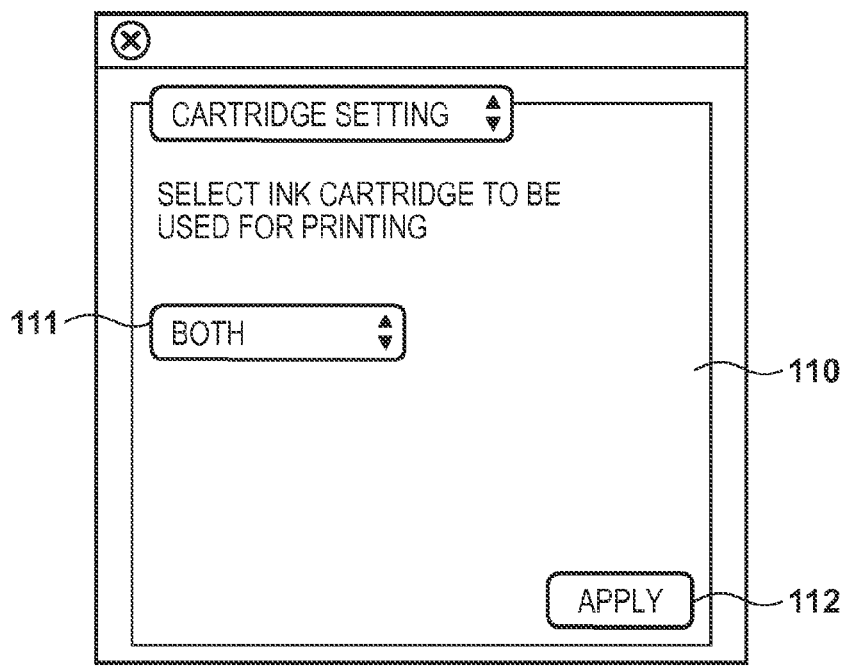

FIG. 3A

200 — APPLICATION OF SET CONTENTS IN PROGRESS.
PLEASE WAIT.

FIG. 3B

201 — PRINTER STATE CHECK IN PROGRESS.
PLEASE WAIT.

F I G. 5A
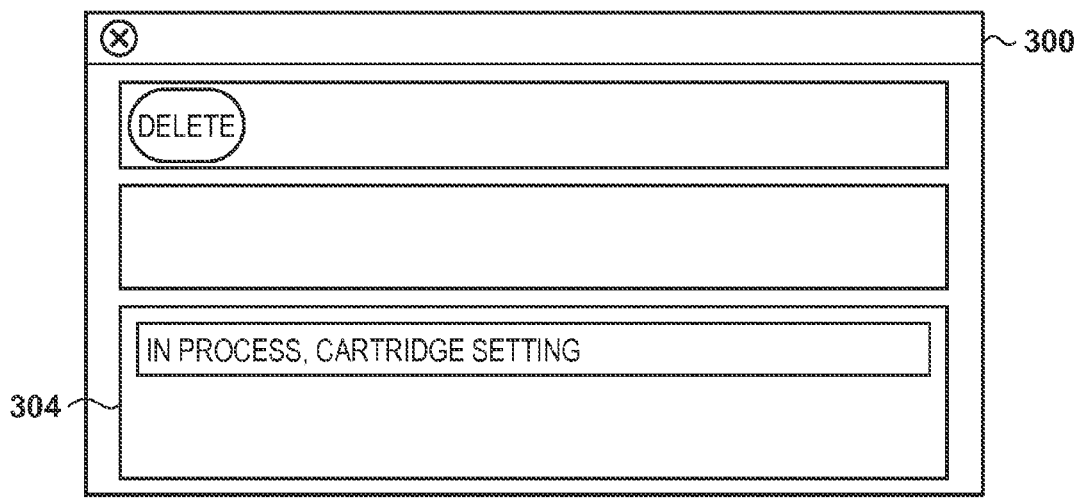
F I G. 5B
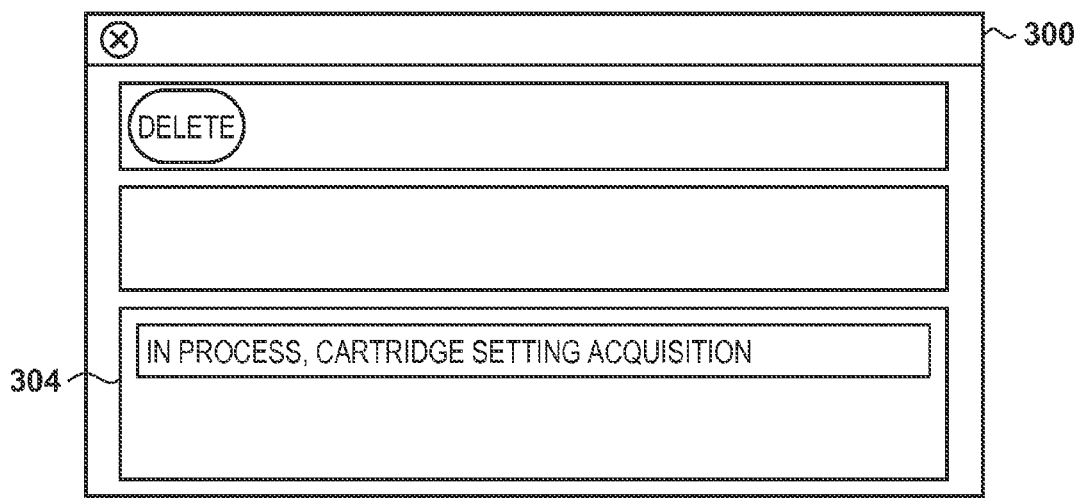

F I G. 6A
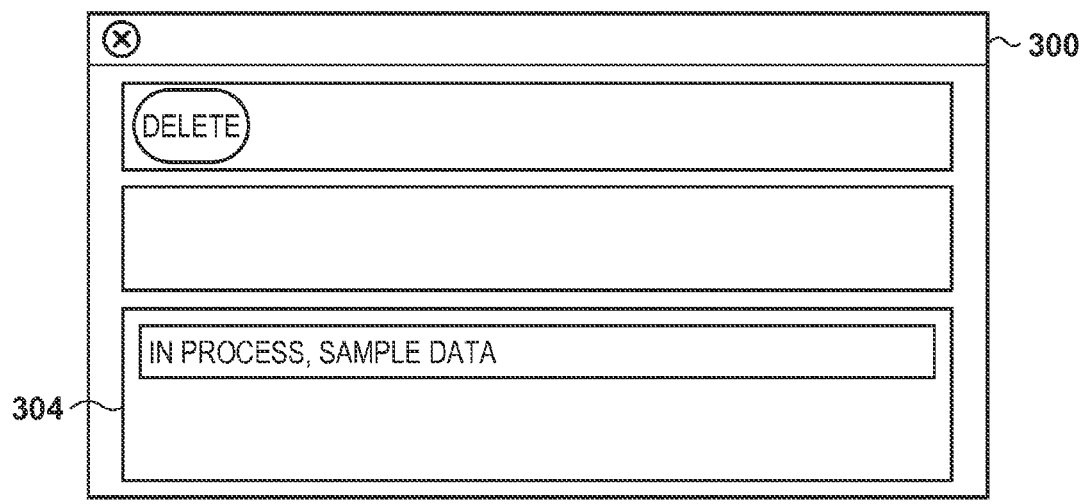
F I G. 6B
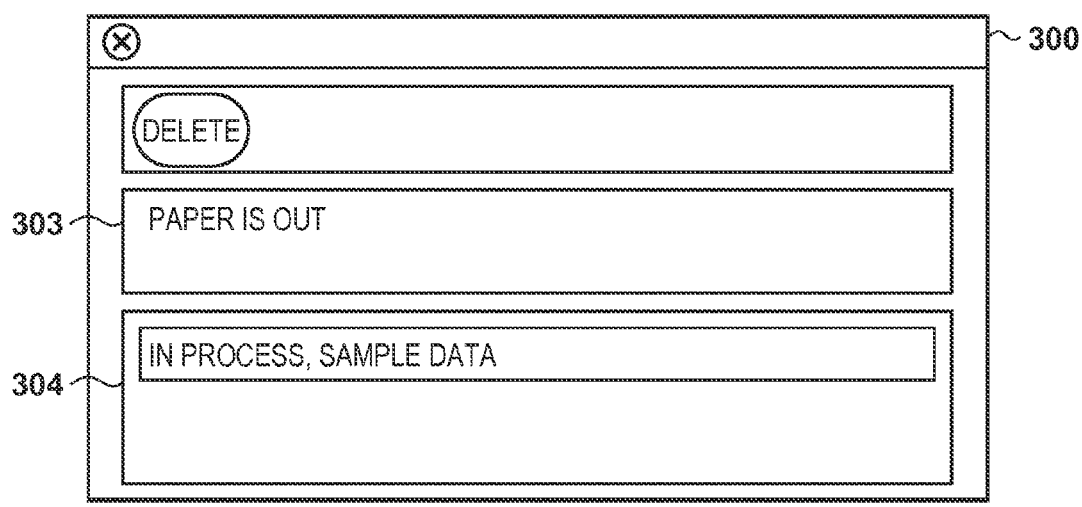

FIG. 17

- 400 — *AutoPowerOn: 1
- 401 — *AutoPowerOff: 1
- 402 — *InkSaveMode: 0
- 403 — *CartridgeSetting: 3
- 404 — *cupsIPPReason com.cij.paper-out-error/PAPER IS OUT : ""
- 405 — *cupsIPPReason com.cij.ink-out-error/INK IS OUT : ""
- 406 — *cupsIPPReason com.cij.off-line-error/UNABLE TO COMMUNICATE WITH PRINTER : ""
- 407 — *cupsIPPReason com.cij.other-error/ERROR HAS OCCURRED : ""

INFORMATION PROCESSING APPARATUS WHICH STORES A SETTING STATE TO BE ACQUIRED BY A CLIENT APPARATUS

BACKGROUND OF THE INVENTION

Field of the Invention

The present invention relates to a server apparatus that controls a printing apparatus, and an information processing apparatus connected to the server apparatus via a network.

Description of the Related Art

Conventionally, there exists a technique for, in a client-server printing system formed from a printer and a plurality of personal computers (to be referred to as PCs hereinafter), causing a client PC to query a server PC about a print setting state and displaying the print setting state of the server PC on the client PC (Japanese Patent No. 3431565). In this technique, the client PC queries the server PC about the print setting state, and the server PC notifies the client PC of the print setting state in response to the query from the client PC. Then, the client PC displays the print setting state notified by the server PC on the screen.

In the conventional technique, however, an arrangement that allows the client PC and the server PC to directly transmit/receive the print setting state needs to be prepared. For this reason, in a client-server printing system without such an arrangement prepared, the client PC may be unable to acquire and display the print setting state of the server PC.

SUMMARY OF THE INVENTION

The present invention provides an information processing technique capable of grasping the setting state of a print environment and executing appropriate printing.

In order to achieve the above object, an information processing apparatus according to the present invention has the following arrangement. That is, an information processing apparatus connected, via a network, to a server apparatus that controls a printing apparatus, comprising: a job transmission unit configured to, in a case of causing the printing apparatus to execute printing via the server apparatus, transmit a print job to the server apparatus, and in a case of acquiring a print setting set in one of the server apparatus and the printing apparatus, transmit a setting job concerning the print setting to the server apparatus; an acquisition unit configured to acquire one of a status of printing by the printing apparatus based on the print job and the print setting corresponding to the setting job from the server apparatus as the status of the printing apparatus in accordance with transmission of one of the print job and the setting job by the job transmission unit; and a determination unit configured to determine a print environment of the server apparatus based on the status acquired by the acquisition unit.

According to the present invention, it is possible to grasp the setting state of a print environment and execute appropriate printing.

Further features of the present invention will become apparent from the following description of exemplary embodiments (with reference to the attached drawings).

BRIEF DESCRIPTION OF THE DRAWINGS

FIG. 2A is a view showing the operation window of a utility;

FIG. 2B is a view showing the operation window of the utility;

FIG. 3A is a view showing a dialogue during processing of the utility;

FIG. 3B is a view showing a dialogue during processing of the utility;

FIG. 5A is a view showing the window of the job display portion;

FIG. 5B is a view showing the window of the job display portion;

FIG. 6A is a view showing the window of the job display portion;

FIG. 6B is a view showing the window of the job display portion;

FIG. 17 is a view showing a part of a PPD file;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving approach of the present invention.

<First Embodiment>

Figure 1:
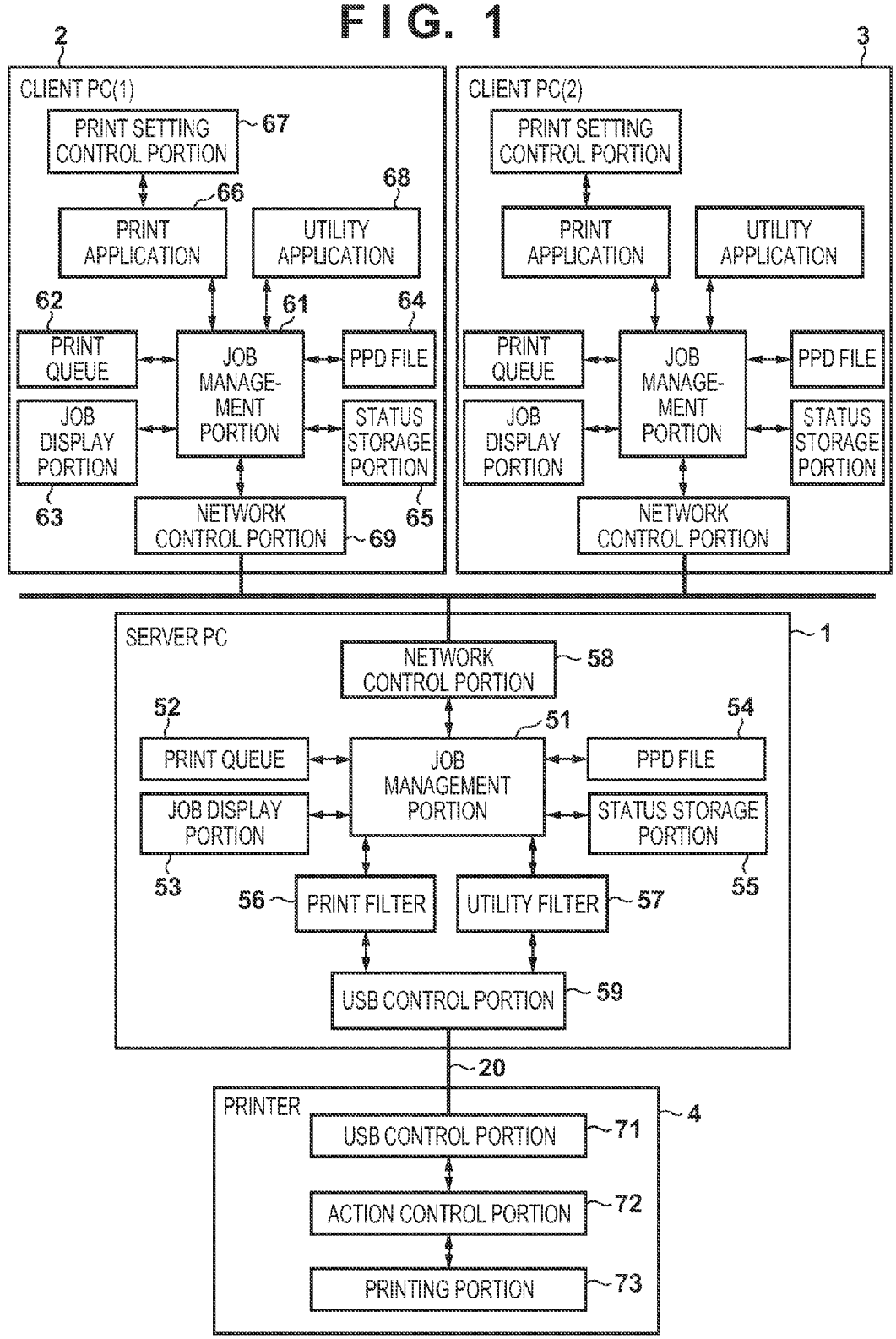
FIG. 1 is a block diagram showing the overall arrangement of a printing system.

FIG. 1 is a block diagram showing the overall arrangement of a client-server printing system according to this embodiment.

The client-server printing system is formed from a server PC 1 that is a server apparatus, client PCs 2 and 3 that are client apparatuses, and a printer 4 that is a printing apparatus. The server PC 1 and the client PCs 2 and 3 are connected to a network 10 and can communicate with each other (transmit/receive information). The network is here assumed to be a LAN (Local Area Network) but may be a WAN (Wide Area Network). The network can employ either a wired or wireless connection configuration, and both configurations may coexist. The printer 4 is connected to the server PC 1 via a communication interface 20. The server PC 1 executes control of the printer 4. The communication interface is assumed to be a USB (Universal Serial Bus) here.

Each of the server PC 1 and the client PCs 2 and 3 is a personal computer in which, for example, Mac OS® X acts as the OS. Although not illustrated in FIG. 1, the resource of the PC, for example, constituent elements in the PC are managed by the OS. The PC has the hardware arrangement of a general information processing apparatus.

More specifically, the PC includes a CPU, a ROM, a hard disk, a RAM, and various device controllers. The CPU executes programs such as the OS and a print application stored in the program ROM of the ROM or loaded from the hard disk to the RAM. The processes of flowcharts to be described later can be implemented by executing the programs. The RAM also functions as a storage area such as the main memory or work area of the CPU. The PC also includes a keyboard, a display, and a controller such as a disk controller (DKC) that controls data access in a storage medium such as a hard disk (HD) or flexible disk (FD) storing various kinds of data. The PC also includes a control portion such as a communication control portion that controls signal exchange between the PCs (for example, the client PCs 2 and 3 and the server PC 1) via the network or signal exchange with the connected printer.

The server PC 1 includes a job management portion 51, a print queue 52, a job display portion 53, a PPD (PostScript Printer Description) file 54, a status storage portion 55, a print filter 56, a utility filter 57, a network control portion 58, and a USB control portion 59.

The client PC 2 has various kinds of functions as program modules stored in the ROM and executed by the CPU. The functions include a job management portion 61, a print queue 62, a job display portion 63, a PPD file 64, a status storage portion 65, a print application 66, a print setting control portion 67, a utility application 68 (to be abbreviated as a utility 68 hereinafter), and a network control portion 69. The client PC 3 has the same arrangement as the client PC 2. In this embodiment, the two client PCs 2 and 3 are assumed to be connected to the network. However, three or more client PCs may be connected.

The printer 4 stores, in the ROM, program modules corresponding to various kinds of functions, like the client PC 2. The functions include a USB control portion 71, an action control portion 72, and a printing portion 73. In this embodiment, for example, CUPS (Common UNIX® Printing System) included in Mac OS X exists as the printing control system of the OS. The CUPS controls the job management portion, the print queue, the PPD file, and the status storage portion in each of the server PC 1 and the client PCs 2 and 3.

In this embodiment, a client PC transmits a print job to the server PC by the CUPS. Although details will be described later, in this embodiment, the CUPS transmits, to the server PC, a job to cause the client PC to acquire a print setting state of the server PC or printer. When the CUPS transmits such a job, each of the client PCs and the server PC performs the same processing as that for a print job, thereby transmitting/receiving the job. That is, a client PC can send a print setting request to the server PC or acquire a print setting state without performing processing different from job transmission by the CUPS.

An action between the server PC 1 and the client PC 2 will be described below as an example of the action between the server PC and a client PC. The action to be described below can be implemented between the server PC 1 and the client PC 3 as well or with respect to any other client PC.

The PPD file 54 of the server PC 1 describes print environment information representing functions and information usable in the printer 4 serving as a printing apparatus. The print environment information includes, for example, the sizes and types of paper sheets that are printing media usable in the printer 4 and initial values thereof. The PPD file 54 also describes display messages corresponding to the action states of various printers. For example, when the client PC 2 selects and registers the printer 4 connected to the server PC 1 to use the printer 4 from the client PC 2, the OS copies the contents described in the PPD file 54 of the server PC 1 to the PPD file 64 of the client PC 2.

When the user is going to print print data created by the print application 66 on the client PC 2, the print setting control portion 67 queries the job management portion 61 about print environment information such as the paper sizes and paper types described in the PPD file 64, acquires them, and prompts the user to do print settings. When the user makes the print settings and requests printing, the request is input to the job management portion 61 as a print job. The job management portion 61 manages print jobs by the print queue and sequentially extracts and processes them. The job management portion 61 extracts the print job from the print queue 62 and transmits it to the job management portion 51 of the server PC 1 via the network control portion 69.

However, for example, when the client PC 2 on the network changes the settings of the printer 4 or the printer driver of the server PC 1, the client PC 2 may be unable to acquire the print setting state even if the updated print settings are stored in the PPD file 54. For example, to acquire the latest information of the PPD file 54, the server PC 1 and the client PC 2 need to have an arrangement to directly communicate the contents of the PPD file 54, which is different from the arrangement to communicate information about a print job.

For this reason, in a printing system including an OS that does not have the arrangement, even if the client PC 2 can acquire the print setting state at the time of registration of the printer 4, it may be impossible for the client PC 2 to acquire a setting newly added or changed in the printer or the printer driver of the server PC 1 after the registration.

In this embodiment, upon receiving a setting acquisition job from the client PC 2, the server PC 1 copies the print setting state in the PPD file 54 to the status storage portion 55 and notifies the client PC 2 of the print setting state stored in the status storage portion 55.

Although details will be described later, when the server PC 1 receives a print job from the client PC 2 and causes the printer 4 to execute printing, printing completion information representing that the printer 4 has completed printing is stored in the status storage portion 55. The client PC 2 is notified of the printing completion information.

In this embodiment, as described above, the client PC 2 issues the setting acquisition job, and the server PC 1 notifies the client PC 2 of the print setting state stored in the status storage portion 55. It is therefore possible to notify the client PC 2 of the latest print setting state in the PPD file 54 by the same arrangement as that used to notify the client PC 2 of the printing completion information. The client PC 2 can acquire the latest print setting state by performing job issuance processing like print job issuance and notifying the server PC 1 of the setting acquisition job. Hence, the client PC 2 can acquire the latest print setting state without performing processing different from job issuance to acquire the latest print setting state.

Note that the print setting state according to this embodiment includes the enabled/disabled state of an automatic power-on setting of automatically powering on the printer 4 when a print job is input to the printer 4 and the enabled/disabled state of an automatic power-off setting of automatically powering off the printer 4 when it is unused for a predetermined time. The print setting state also includes the setting state of an ink cartridge used for printing by the printer 4 and on/off of ink saving setting for saving inks used for printing.

Details of the above processing will be described later.

In the server PC 1, the job management portion 51 receives a print job, a setting job, or a setting acquisition job from the client PC 2 via the network control portion 58. The job management portion 51 manages print jobs, setting jobs, or setting acquisition jobs transmitted from the client PC 2 by the print queue 52 and sequentially extracts and processes them. The job management portion 51 extracts the print job from the print queue 52 and transmits it to the print filter 56. The print filter 56 functioning as a printer driver generates print data and transmits it to the printer 4 via the USB control portion 59. After that, the print filter 56 monitors the action state of the printer 4 until print processing is completed. During this time, the print filter 56 acquires a status from the printer 4 via the USB control portion 59, and periodically stores the result of analysis in the status storage portion 55 as the action state of the printer 4. The status storage portion 55 can store a plurality of statuses. The print filter 56 can store a plurality of action states of the printer 4.

Storage in the status storage portion 55 is done via the job management portion 51. When the print filter 56 requests the job management portion 51 to store the action state of the printer 4, the job management portion 51 stores the action state. It is also possible to delete an already stored action state of the printer 4. When the print filter 56 requests the job management portion 51 to delete an already stored action state of the printer 4, the job management portion 51 deletes the action state. The job display portion 53 acquires, via the job management portion 51, a status stored in the status storage portion 55, acquires a display message corresponding to the action state of the printer 4 from the PPD file 54, and displays it. The job display portion 53 also acquires print jobs managed by the print queue 52 from the job management portion 51, and displays them as a list of jobs under the management of the print queue 52.

On the other hand, the job display portion 63 of the client PC 2 also acquires print jobs managed by the print queue 62 from the job management portion 61 and displays them. The processing state of each print job transmitted to the job management portion 51 of the server PC 1 is reflected on the job management portion 61 of the client PC 2 by the OS and displayed on the job display portion 63 until the job management portion 51 of the server PC 1 completes processing. The action state of the printer 4 stored in the status storage portion 55 of the server PC 1 is periodically transmitted to the client PC 2 by the OS of the server PC 1 during processing of the print job. The action state is then copied to the status storage portion 65 of the client PC 2. The job display portion 63 acquires the copied action state of the printer 4 by querying the job management portion 61, acquires a corresponding display message from the PPD file 64, and displays it.

As described above, when a print job is transmitted to the server PC 1, and printing is executed, the client PC 2 can acquire the action state (error, progress of printing, printing completion, or the like) of the printer 4 from the status storage portion 55 of the server PC 1. In this embodiment, the client PC 2 acquires the print setting state of the printer or the printer driver of the server PC 1 from the status storage portion 55 of the server PC 1 in addition to the action state of the printer.

The utility 68 of the client PC 2 can set an action mode or print data generation mode of the printer 4. When the user requests the setting on the utility 68 of the client PC 2, the request is input to the job management portion 61 as a setting job to cause the printer 4 to do the setting, processed like a print job, and transmitted to the job management portion 51 of the server PC 1. The job management portion 51 of the server PC 1 extracts the setting job from the print queue 52 and transmits it to the utility filter 57.

The utility filter 57 of the server PC 1 generates a control command to set the action mode of the printer 4 and transmits it to the printer 4 via the USB control portion 59. After that, the utility filter 57 monitors the action state of the printer 4 until transmission processing is completed. During this time, the utility filter 57 acquires a status (print setting state) from the printer 4 via the USB control portion 59, and periodically stores the result of analysis in the status storage portion 55 as the action state of the printer 4, like the print filter 56. When the transmission processing is completed, the utility filter 57 adds the set value of the action mode and the set value of the print data generation mode of the printer 4 to the PPD file 54. However, the contents described in the PPD file 54 of the server PC 1 are copied to the PPD file 64 of the client PC 2 only when the printer 4 connected to the server PC 1 is registered by the client PC 2. Here, the set values added to the PPD file 54 of the server PC 1 are not reflected on the PPD file 64 of the client PC 2.

The set values added to the PPD file 54 of the server PC 1 are then referred to by the print filter 56 or utility filter 57 acting on the server PC 1 and used to control processing of the filters.

In this embodiment, the utility filter 57 stores the setting state of the print data generation mode in the status storage portion 55 as well. That is, the status storage portion 55 can store not only the action state of the printer 4 but also various setting states of the print environment of the printer 4 as a plurality of statuses. The utility filter 57 can also store and delete various setting states via the job management portion 51, like the action state of the printer 4.

A setting state stored in the status storage portion 55 of the server PC 1 is copied to the status storage portion 65 of the client PC 2 by the OS, like the action state of the printer 4. However, since no display message corresponding to the setting state is described in the PPD file 64, the job display portion 63 of the client PC 2 and the job display portion 53 of the server PC 1 display no message even when the setting state is stored in the status storage portion 65. The setting state stored in the status storage portion 65 is then referred to by the utility 68 of the client PC 2 and used to control a screen that displays the setting state of the print environment of the server PC 1.

As described above, in this embodiment, the client PC issues a setting acquisition job (status confirmation job), like print job issuance, and transmits it to the server PC 1, thereby acquiring the setting state of the printer or the printer driver of the server PC 1.

Hence, the utility 68 of the client PC 2 can also confirm the current setting state of the action mode or print data generation mode of the printer 4. The utility 68 acquires the setting state stored in the status storage portion 65 and displays it on the screen.

Processing of acquiring the print setting state of the server PC 1 by job issuance will be described in more detail.

When displaying a setting state, the utility 68 inputs a setting acquisition job that requests acquisition of the setting state to the job management portion 61. The setting acquisition job is processed like a setting job and transmitted to the job management portion 51 of the server PC 1.

When the job management portion 51 of the server PC 1 transmits the setting acquisition job received from the client PC 2 to the utility filter 57, the utility filter 57 acquires, from the printer 4, the setting of the action mode of the printer 4, and stores the setting state of the action mode of the printer 4 in the status storage portion 55 based on the result of analysis. The setting state of the action mode of the printer 4 stored in the status storage portion 55 here and the setting state of the print data generation mode stored at the time of processing of the setting job are periodically copied to the status storage portion 65 of the client PC 2 by the OS during processing of the setting acquisition job, as in processing of a print job. The utility 68 of the client PC 2 acquires these copied setting states by querying the job management portion 61 and displays them on the screen.

The printer 4 receives print data from the server PC 1 via the USB control portion 71 or returns the status of the printer 4 in response to a status query from the server PC 1. The action control portion 72 controls the printing portion 73 based on the print data received from the server PC 1 to print on a paper sheet. Upon receiving a control command to set the action mode of the printer 4 from the server PC 1, the action control portion 72 sets the action mode of the printer 4 based on the control command.

In this embodiment, an example will be described in which there are provided a print setting control portion, a print filter, a utility, and a utility filter which act in cooperation with CUPS that is the printing control system of Mac OS X acting on each of the client PC 2 and the server PC 1 of such a client-server printing system.

FIGS. 2A and 2B are views showing the operation window of the utility 68 of the client PC 2.

As the setting of the action mode of the printer 4, the utility 68 can make an automatic power-on setting of automatically powering on the printer 4 when a print job is input to the printer and an automatic power-off setting of automatically powering off the printer when it is unused for a predetermined time. In addition, as the setting of the print data generation mode, the utility 68 can make an ink saving setting for saving inks used for printing and a setting of an ink cartridge used for printing. These settings can be done from either of the two client PCs 2 and 3 on the network. The automatic power-on setting is the setting of a function of automatically powering on the printer 4. When the automatic power-on setting is enabled, the printer 4 is automatically activated upon receiving print data or a control command from the server PC 1. The automatic power-off setting is the setting of a function of automatically powering off the printer 4. When the automatic power-off setting is enabled, the printer 4 is automatically powered off after the elapse of a predetermined time (for example, 30 min) in an unused state.

The ink saving setting is the setting of a function of decreasing the ink usage at the time of printing. When the ink saving setting is enabled, the print filter 56 of the server PC 1 generates print data of less ink usage. The cartridge setting is the setting of a function of designating a cartridge to be used at the time of printing. In this embodiment, an inkjet printer including a black cartridge and a color cartridge is assumed as the printer 4. For both cartridges, only the color cartridge, or only the black cartridge can be designated to be used. In accordance with the cartridge setting, the print filter 56 of the server PC 1 generates print data that uses the designated cartridge.

Note that the contents settable by the utility 68 are not limited to those shown in FIGS. 2A and 2B, and various settings can be done in accordance with the print environment or functions of the printer 4, as a matter of course. For example, the utility 68 can make various print processing settings such as a paper size, paper orientation, single/double-sided printing, and finishing method. The printing method is not limited to the inkjet method, and any other printing method such as an electrophotographic method or a thermal transfer method can be employed.

When the user activates the utility 68, an operation window 100 is displayed. Note that when the utility 68 is activated, setting state acquisition processing shown in FIG. 9 to be described later is executed, and setting states in the printer 4 or the printer driver of the server PC 1 are reflected as initial values in the operation window 100.

Figure 4A:
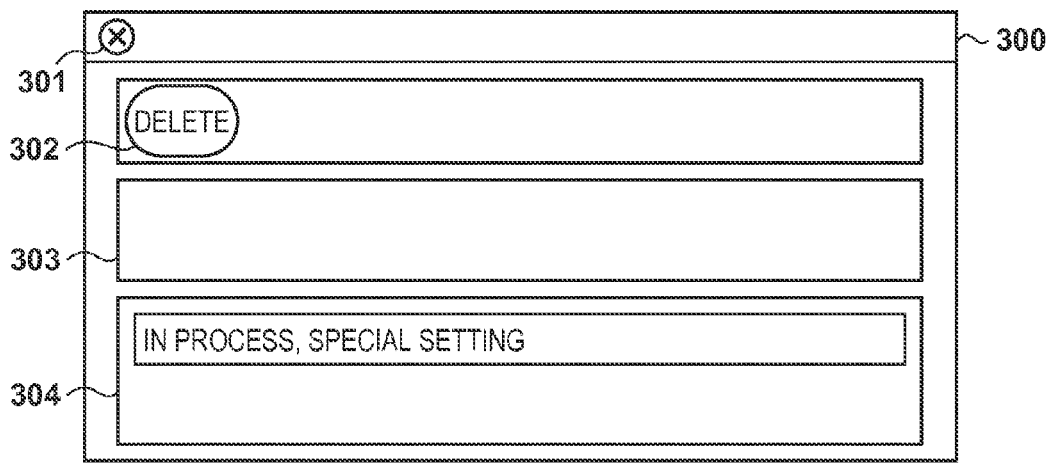
FIG. 4A is a view showing the window of a job display portion.
Figure 4B:
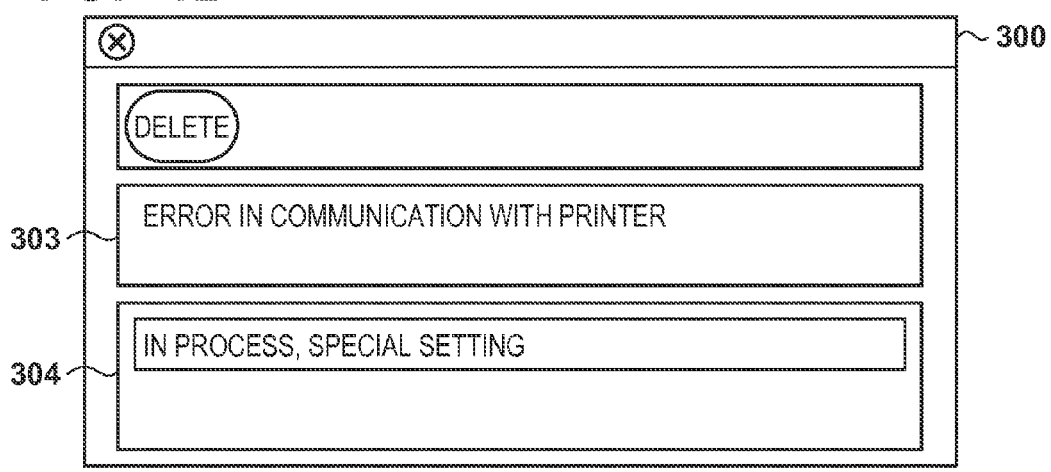
FIG. 4B is a view showing the window of the job display portion.

The user can close the operation window 100 and end the utility 68 by a close button 101. The user can also switch the operation screen of the utility 68 by a tab menu 102 in which a plurality of menu items are registered. When the user selects "special setting" of the tab menu 102, the utility 68 displays a special setting screen 103. When the user selects "cartridge setting" of the tab menu 102, the utility 68 displays a cartridge setting screen 110. FIG. 4A shows the operation window of the utility 68 when the special setting screen 103 is displayed. FIG. 4B shows the operation window of the utility 68 when the cartridge setting screen 110 is displayed.

In the special setting screen 103, the user can make the automatic power-on setting, automatic power-off setting, and ink saving setting. The user can set the enabled/disabled state of the automatic power-on function of the printer 4 by an automatic power-on setting checkbox 104. The function is disabled (no checkmark in the checkbox) in the initial state in which the function has never been set. The user can set the enabled/disabled state of the automatic power-off function of the printer 4 by an automatic power-off setting checkbox 105. The function is disabled (no checkmark in the checkbox) in the initial state in which the function has never been set. The user can set the enabled/disabled state of the ink saving function by an ink saving setting checkbox 106. The function is disabled (no checkmark in the checkbox) in the initial state in which the function has never been set.

By pressing an apply button 107, the user can apply the automatic power-on setting and automatic power-off setting to the printer 4 connected to the server PC 1 and the ink saving setting to the print processing of the server PC 1 in accordance with the check states of the various setting checkboxes. When the apply button 107 is pressed, the utility 68 inputs a special setting job to the job management portion 61. After that, a setting dialogue 200 shown in FIG. 3A is displayed until the special setting job is processed. When processing of the special setting job is completed, the utility 68 closes the setting dialogue 200 and returns to the special setting screen 103.

The utility 68 of the client PC 2 displays the special setting screen 103 immediately after activation. When displaying the special setting screen 103, the utility 68 sets the setting checkboxes of the various functions to the setting states in the server PC 1 and displays it. With this display, the utility 68 can present the current setting state of the print environment of the server PC 1 or the printer 4 connected to the server PC 1 to the user even when the setting states of the various functions are changed from another client PC on the network.

When displaying the special setting screen 103, the utility 68 inputs a special setting acquisition job to the job management portion 61. When the special setting acquisition job is input, the utility filter 57 of the server PC 1 stores, in the status storage portion 55, the setting states in the server PC 1, and the OS copies them to the status storage portion 65 of the client PC 2. Details of this processing will be described later.

After that, until the setting states of special settings stored in the status storage portion 65 of the client PC 2 are acquired, a setting acquisition dialogue 201 shown in FIG. 3B is displayed. When acquisition of the setting states of the special settings is completed, the setting acquisition dialogue 201 is closed, and the acquired setting states are reflected on the various setting checkboxes of the special setting screen 103. If these functions are not set yet, an action is done in the initial state of the print environment of the server PC 1 and the printer 4 connected to the server PC 1. Hence, the utility 68 displays the various setting checkboxes in the initial state.

The user can make a cartridge setting in the cartridge setting screen 110. The user can set a cartridge to be used at the time of printing by a cartridge setting pop-up menu 111. The cartridge setting pop-up menu 111 has items "both", "only color", and "only black", and the user can set one of them. When "both" is set, the print filter 56 generates print data to print using both the black cartridge and the color cartridge at the time of print processing. When "only color" is set, the print filter 56 generates print data to print using only the color cartridge. When "only black" is set, the print filter 56 generates print data to print using only the black cartridge. "Both" is set in the initial state in which the setting has never been done. By pressing an apply button 112, the user can apply the cartridge setting to the print processing. When the apply button 112 is pressed, the utility 68 inputs a cartridge setting job to the job management portion 61. After that, the setting dialogue 200 shown in FIG. 3A is displayed until the cartridge setting job is processed. When processing of the cartridge setting job is completed, the utility 68 closes the setting dialogue 200 and returns to the cartridge setting screen 110.

When displaying the cartridge setting screen 110, the utility 68 of the client PC 2 sets the cartridge setting pop-up menu 111 to the setting state in the server PC 1. With this display, the utility 68 can present the current setting state of the print environment of the server PC 1 or the printer 4 connected to the server PC 1 to the user even when the setting state is changed from another client PC on the network.

When displaying the cartridge setting screen 110, the utility 68 inputs a cartridge setting acquisition job to the job management portion 61. When the cartridge setting acquisition job is input, the utility filter 57 of the server PC 1 stores, in the status storage portion 55, the setting state in the server PC 1, and the OS copies it to the status storage portion 65 of the client PC 2. Details of this processing will be described later. After that, until the setting state of cartridge setting stored in the status storage portion 65 of the client PC 2 is acquired, the setting acquisition dialogue 201 shown in FIG. 3B is displayed. When acquisition of the setting state of the cartridge setting is completed, the setting acquisition dialogue 201 is closed, and the acquired setting state is reflected on the cartridge setting pop-up menu 111 of the cartridge setting screen 110. If the cartridge setting is not made yet, an action is done in the initial state of the print environment of the server PC 1. Hence, the utility 68 displays the cartridge setting pop-up menu 111 in the initial state.

FIGS. 3A and 3B show dialogues during processing of the utility 68 of the client PC 2.

The utility 68 displays the setting dialogue 200 shown in FIG. 3A during setting of various functions in the special setting screen 103 or the cartridge setting screen 110. When the apply button on the various setting screens is pressed, the utility 68 inputs a setting job to the job management portion 61 and displays the setting dialogue 200. When processing of the input setting job is completed, the setting dialogue 200 is closed, and the screen returns to the various setting screens. The utility 68 acquires the setting states in the server PC 1 corresponding to various functions in each screen before displaying the special setting screen 103 or the cartridge setting screen 110. At this time, the setting acquisition dialogue 201 shown in FIG. 3B is displayed. When displaying the various setting screens, the utility 68 inputs a setting acquisition job to the job management portion 61 and displays the setting acquisition dialogue 201. When processing of the input job is completed, the setting acquisition dialogue 201 is closed, and the acquired setting states or initial values are reflected on each setting screen.

Figure 4C:
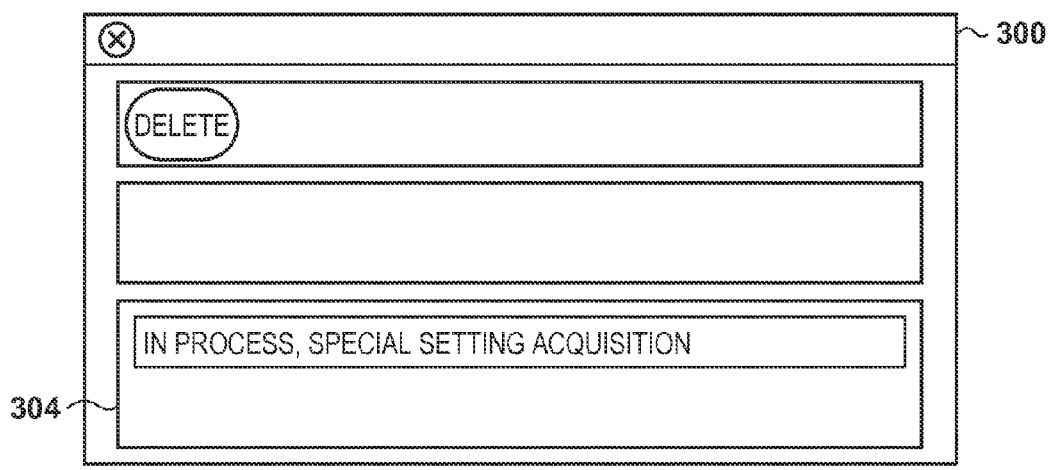
FIG. 4C is a view showing the window of the job display portion.

FIGS. 4A to 4C are views showing the window of the job display portion 63 of the client PC 2 and the job display portion 53 of the server PC 1.

The action of the job display portion 63 of the client PC 2 will be described below. The same action is executed for the job display portion 53 of the server PC 1 as well.

The job display portion 63 is controlled by the OS. When the user opens the job display portion 63, the OS opens a job display window 300. The user can close the job display window 300 by a close button 301. The user can also cancel a job under execution by a delete button 302. Display messages corresponding to the action states of various printers 4 described in the PPD file 64 are displayed in a status display region 303.

Upon acquiring a status stored in the status storage portion 65, the job display portion 63 queries the job management portion 61 about a display message corresponding to it. If a display message corresponding to the status of the query is described in the PPD file 64, the job management portion 61 returns it to the job display portion 63. If no corresponding display message is described in the PPD file 64, the job management portion 61 returns a value representing the absence to the job display portion 63.

When the corresponding display message is returned from the job management portion 61, the job display portion 63 displays it in the status display region 303. If the value representing the absence of the corresponding display message is returned from the job management portion 61, the job display portion 63 displays no message. In this embodiment, the PPD file 64 describes display messages corresponding to a paper-out error state, an ink-out error state, a communication error state, and other error states as the action states of various printers. Hence, when these error states are stored in the status storage portion 65, corresponding display messages are displayed in the status display region 303. Even when the statuses of the setting states of various functions of the utility 68 are stored in the status storage portion 65, no message is displayed in the status display region 303 because no corresponding display messages are described in the PPD file 64. A list of jobs managed by the print queue 62 is displayed in a job display region 304.

Especially, FIG. 4A shows the job display window 300 that is displayed when the utility 68 has input a special setting job in accordance with a setting in the special setting screen 103. The special setting job under processing is displayed in the job display region 304. At this time, the name "special setting" of the job input by the utility 68 is displayed.

FIG. 4B shows the job display window 300 that is displayed when an error has occurred during processing of a special setting job. The job display window 300 displayed when a communication error has occurred during processing is illustrated here as an example. A display message corresponding to the communication error state stored in the status storage portion 65 by the utility filter 57 is displayed in the status display region 303. The job display portion 63 acquires the display message corresponding to the communication error state from the PPD file 64 via the job management portion 61 and displays it in the status display region 303.

FIG. 4C shows the job display window 300 that is displayed when the utility 68 has input a special setting acquisition job in accordance with display in the special setting screen 103. The special setting acquisition job under processing is displayed in the job display region 304. At this time, the name "special setting acquisition" of the job input by the utility 68 is displayed.

FIGS. 5A and 5B are also views showing the job display window 300 of the job display portion 63.

FIGS. 5A and 5B show the job display window 300 that is displayed when a cartridge setting job is input and that when a cartridge setting acquisition job is input, respectively. Each job under processing is displayed in the job display region 304. At this time, the names "cartridge setting" and "cartridge setting acquisition" of the jobs input by the utility 68 are displayed.

FIGS. 6A and 6B are also views showing the job display window 300 of the job display portion 63.

FIG. 6A shows the job display window 300 that is displayed when a print job is input in accordance with a print request from the print application 66. The print job under processing is displayed in the job display region 304. At this time, the name of the print job input by the print application 66 is displayed.

FIG. 6B shows the job display window 300 that is displayed when an error has occurred during processing of a print job. The job display window 300 displayed when a paper-out error has occurred during printing is illustrated here as an example. A display message corresponding to the paper-out error state stored in the status storage portion 55 by the print filter 56 is displayed in the status display region 303. The job display portion 63 acquires the display message corresponding to the paper-out error state from the PPD file 64 via the job management portion 61 and displays it in the status display region 303.

Processing of setting, in the printer 4 via the server PC 1, a special setting set by the utility 68 of the client PC 2 will be described next with reference to FIGS. 7 and 8.

Figure 7:
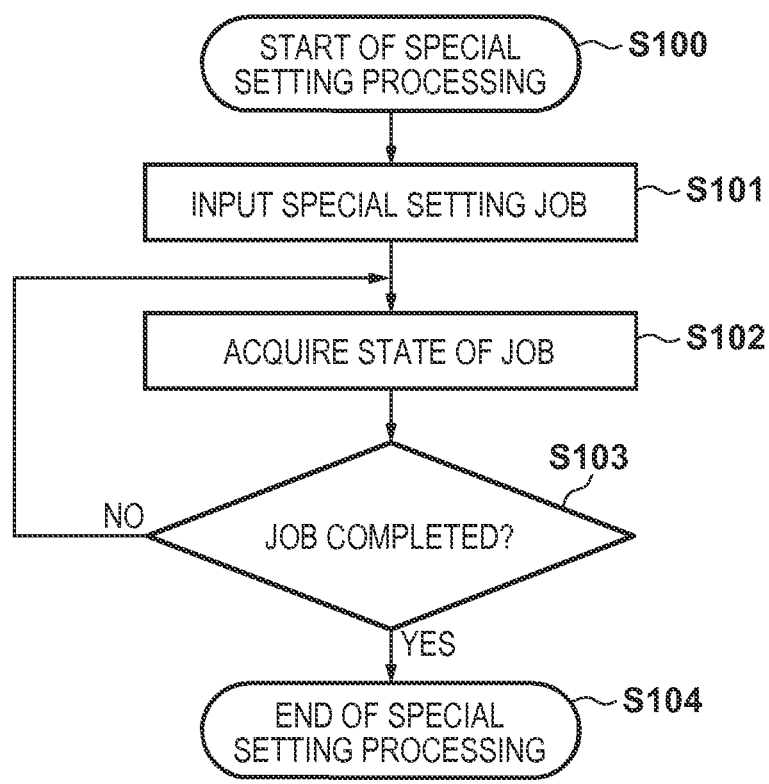
FIG. 7 is a flowchart showing special setting processing of the utility.

FIG. 7 is a flowchart showing special setting processing of the utility 68 of the client PC 2. Note that a program corresponding to the processing shown in the flowchart of FIG. 7 is stored in the ROM of the client PC 2, and the CPU of the client PC 2 executes the program on the RAM, thereby implementing the processing shown in FIG. 7.

When the user presses the apply button 107 in the special setting screen 103, the utility 68 executes special setting processing. In step S100, the utility 68 starts special setting processing. In step S101, the utility 68 inputs a special setting job to the job management portion 61. The special setting job input in the client PC 2 is transmitted to the job management portion 51 of the server PC 1 by the OS. In step S102, the utility 68 acquires the processing state of the special setting job input by itself by querying the job management portion 61. In step S103, the utility 68 determines based on the acquired processing state of the job whether the special setting job is completed. Upon determining that the job is not completed (NO in step S103), the process returns to step S102, and the utility 68 acquires the processing state of the job from the job management portion 61 again. Upon determining that the job is completed (YES in step S103), the process advances to step S104 to end the processing.

With the processing shown in FIG. 7, a print setting (for example, automatic power-on setting) that the user causes the printer 4 to set can be notified to the server PC 1 by the job format "special setting job".

Figure 8:
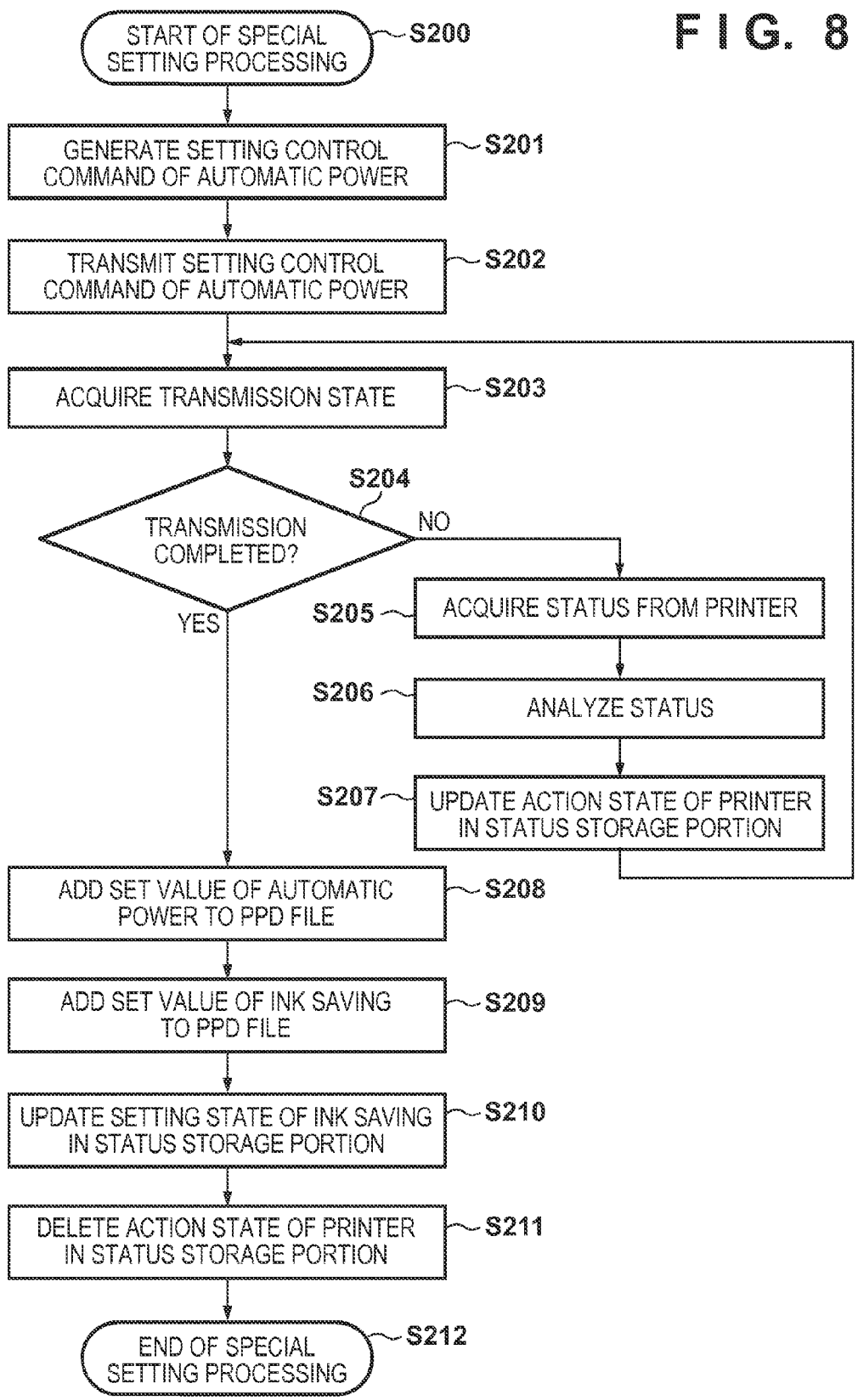
FIG. 8 is a flowchart showing special setting processing of a utility filter.

FIG. 8 is a flowchart showing special setting processing of the utility filter 57 of the server PC 1. Note that a program corresponding to the processing shown in the flowchart of FIG. 8 is stored in the ROM of the server PC 1, and the CPU of the server PC 1 executes the program on the RAM, thereby implementing the processing shown in FIG. 8.

When the utility 68 of one of the two client PCs 2 and 3 on the network performs special setting of various functions, a special setting job is input to the job management portion 61 and transmitted to the job management portion 51 of the server PC 1. When the special setting job is transmitted from the job management portion 51, the utility filter 57 of the server PC 1 executes the special setting processing. Note that an automatic power-on setting, an automatic power-off setting, and an ink saving setting will be exemplified here as print settings.

In step S200, the utility filter 57 starts special setting processing. In step S201, the utility filter 57 generates a setting control command based on the set values of the automatic power-on setting and the automatic power-off setting transmitted together with the special setting job. The automatic power settings are contents to be set in the printer itself, and the set contents need to be notified to the printer. Hence, the setting control command is generated in step S201.

In step S202, the utility filter 57 transmits the generated setting control command to the printer 4. Upon receiving the setting control command, the printer 4 sets the action mode of itself.

In step S203, the utility filter 57 acquires the transmission state of the setting control command from the job management portion 51. In step S204, the utility filter 57 determines whether transmission of the setting control command is completed. Upon determining that transmission is not completed (NO in step S204), the process advances to step S205. In step S205, the utility filter 57 acquires a status from the printer 4. In step S206, the utility filter 57 analyzes the acquired status. In step S207, the utility filter 57 updates the action state of the printer 4 in the status storage portion 55 based on the result of status analysis.

In this update, if no error has occurred in the printer 4, the utility filter 57 does not store the status information in the status storage portion 55. If an error has occurred in the printer 4, the utility filter 57 stores the error state in the status storage portion 55. When the error in the printer 4 is solved, the utility filter 57 deletes the error state stored in the status storage portion 55. Display messages corresponding to various error states stored in the status storage portion 55 by the utility filter 57 are described in the PPD file 54 and therefore displayed in the status display region 303 of the job display window 300, as shown in FIG. 4B. The action state of the printer 4 stored in the status storage portion 55 of the server PC 1 is copied to the status storage portion 65 of the client PC 2 by the OS and also displayed in the status display region 303 of the job display window 300 of the client PC 2.

When the error state is updated, the utility filter 57 returns to step S203 to acquire the transmission state of the setting control command from the job management portion 51 again. Upon determining that transmission of the setting control command is completed (YES in step S204), the process advances to step S208.

In step S208, the utility filter 57 adds the set values of automatic power including the automatic power-on setting and the automatic power-off setting to the PPD file 54. The various set values are added to the PPD file 54 by causing the utility filter 57 to notify the job management portion 51 of the function names and the set values. Upon receiving the notification, the job management portion 51 adds the function names and the set values to the PPD file 54. At this time, if the set value of the same function name already exists, the value is overwritten. Overwrite of various set values in the PPD file 54 is also performed when a special setting job is transmitted from another client PC. That is, various set values to be added to the PPD file 54 are based on the setting states by the utility 68 of the client PC that has input the special setting job finally.

In step S209, the utility filter 57 adds the set value of the ink saving setting to the PPD file 54 based on the set value of the ink saving setting transmitted together with the special setting job. Note that the ink saving setting is not a setting for the printer 4 and is reflected when creating print data by the printer driver of the server PC 1. Hence, transmission and setting of the setting command as in steps S201 to S207 are not performed for the printer 4.

In step S210, the utility filter 57 updates the setting state of the ink saving setting in the status storage portion 55. If the setting state of the ink saving setting does not exist in the status storage portion 55, the utility filter 57 newly stores the setting state in the status storage portion 55. If the setting state of the ink saving setting already exists in the status storage portion 55, the utility filter 57 temporarily deletes the setting state and then newly stores the setting state in the status storage portion 55.

Note that like various set values added to the PPD file 54, storage of various set states in the status storage portion 55 is also performed when a setting job is transmitted from another client PC. That is, various set states to be stored in the status storage portion 55 are based on the setting states by the utility 68 of the client PC that has input the special setting job finally. Hence, a setting different from a special setting set by a client PC may be set by another client PC and stored in the PPD file 54.

To prevent this, in this embodiment, the setting state of the ink saving setting stored in the status storage portion 55 is copied to the status storage portion 65 of the client PC 2 by the OS, like the action state of the printer 4 stored in step S207, by processing to be described later with reference to FIG. 9. However, since no display messages corresponding to various setting states stored by the utility filter 57 are described in the PPD file 54, no message is displayed in the status display region 303 of the job display window 300.

In step S211, the utility filter 57 deletes the action state of the printer 4 in the status storage portion 55. If the error state of the printer 4 remains stored in the status storage portion 55 in step S207, the utility filter 57 deletes it. If no error state of the printer 4 is stored in the status storage portion 55, the utility filter 57 performs nothing. After that, in step S212, the utility filter 57 ends the processing.

With the processing shown in FIG. 8 described above, the server PC 1 can update the settings of the printer 4 in accordance with the set values included in the special setting job received from the client PC 2. In addition, the set values are stored in the status storage portion 55, like the action state (error or the like) of the printer 4.

At the end of the processing, the utility filter 57 ends the processing without deleting the setting state of the ink saving setting stored in the status storage portion 55. Hence, the setting state of the ink saving setting remains stored in the status storage portion 55 even when the processing of the utility filter 57 has ended. In the special setting processing, various set values added to the PPD file 54 of the server PC 1 are not reflected on the PPD file 64 of the client PC 2. The set values added to the PPD file 54 of the server PC 1 are referred to by the print filter 56 or utility filter 57 acting on the server PC 1 and used to control processing of the filters.

On the other hand, various setting states stored in the status storage portion 55 of the server PC 1 are then copied to the status storage portion 65 of the client PC 2 by the OS of the server PC 1 by processing shown in FIG. 9 to be described later. The utility 68 of the client PC 2 acquires the various setting states from the status storage portion 65 of the client PC 2 and reflects them on the special setting screen. Details of this processing will be described with reference to FIG. 9.

Figure 9:
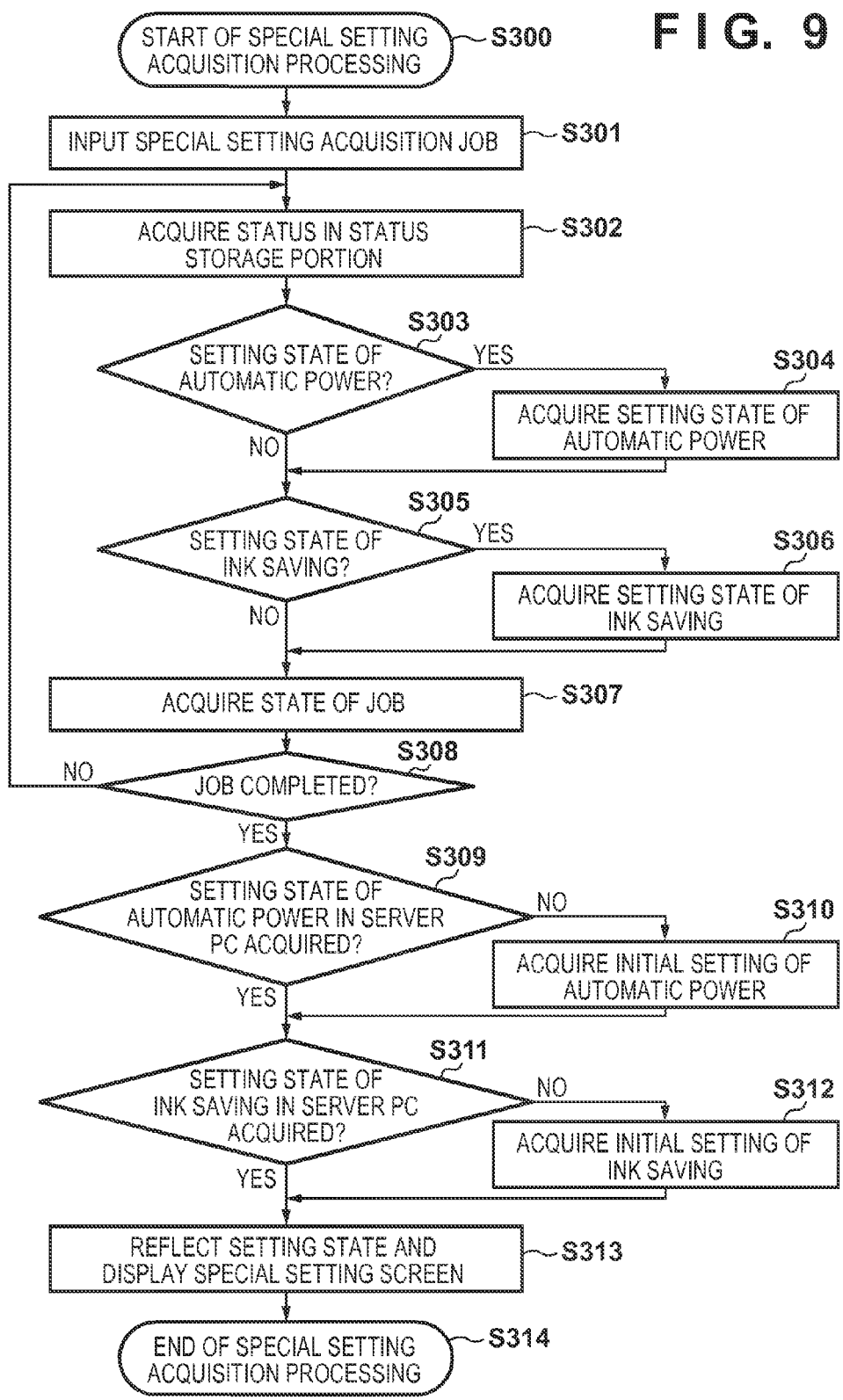
FIG. 9 is a flowchart showing special setting acquisition processing of the utility.

FIG. 9 is a flowchart showing special setting acquisition processing of the utility 68 of the client PC 2. Note that a program corresponding to the processing shown in the flowchart of FIG. 9 is stored in the ROM of the client PC 2, and the CPU of the client PC 2 executes the program on the RAM, thereby implementing the processing shown in FIG. 9.

When activated by an instruction of the user of the client PC 2, the utility 68 executes special setting acquisition processing shown in FIG. 9 before displaying the special setting screen 103, and reflects the acquired setting states on the various setting checkboxes of the special setting screen 103.

In step S300, the utility 68 starts the special setting acquisition processing. In step S301, the utility 68 inputs a special setting acquisition job to the job management portion 61. Upon input of the special setting acquisition job in step S301, the job management portion 61 transmits the special setting acquisition job to the server PC 1. Then, the latest setting states stored in the status storage portion 55 of the server PC 1 are copied to the status storage portion 65 of the client PC 2 by processing of the server PC 1 shown in FIG. 10 to be described later.

Figure 10:
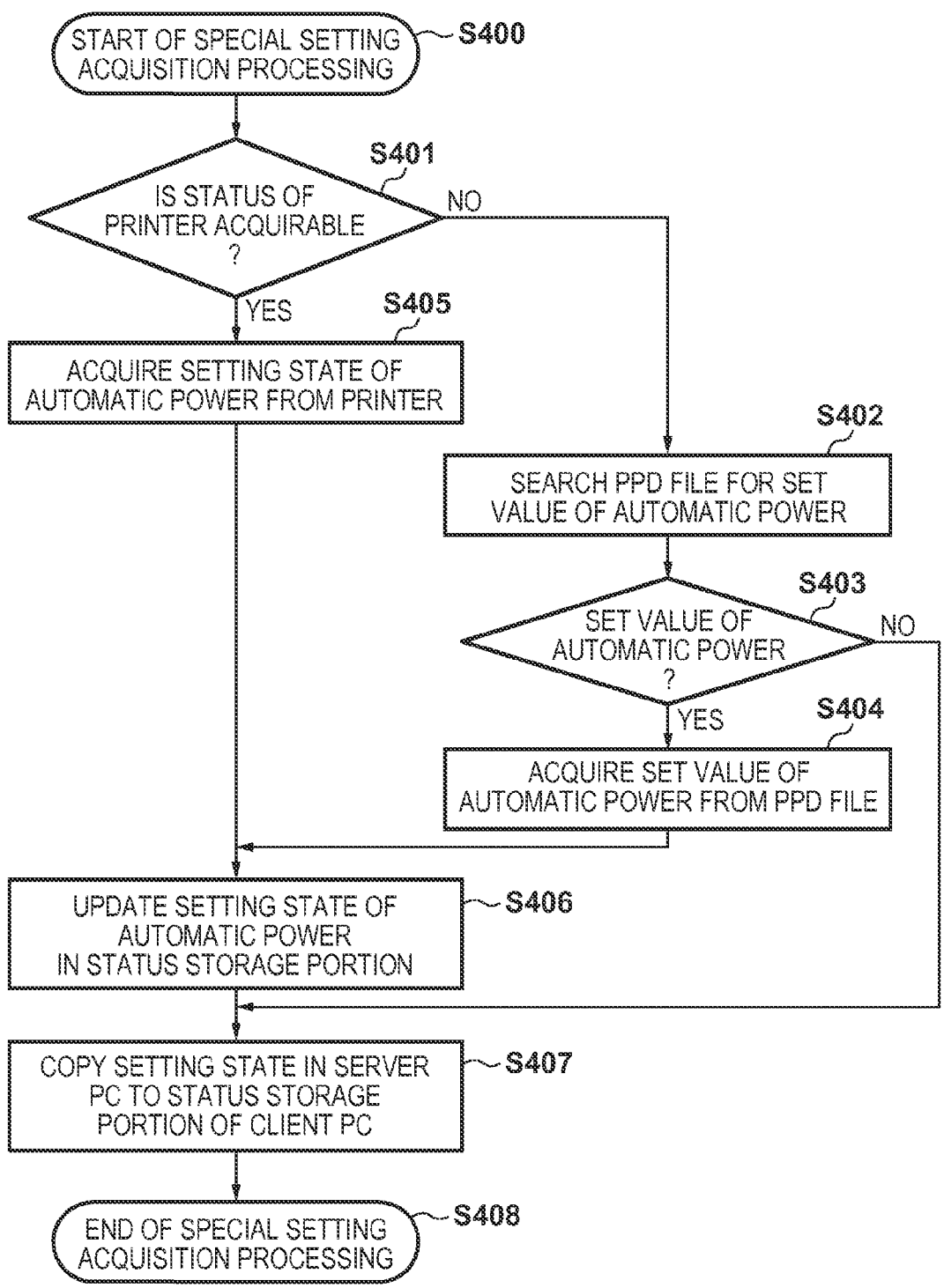
FIG. 10 is a flowchart showing special setting acquisition processing of the utility filter.

In step S302, the utility 68 acquires statuses in the status storage portion 65 via the job management portion 61. When the processing shown in FIG. 10 is performed by the special setting acquisition job input by the process of step S301, the contents in the status storage portion 55 of the server PC 1 are copied to the status storage portion 65 by the OSs of the client PC 2 and the server PC 1. Hence, in step S302, the utility 68 can acquire the latest print setting state in the server PC 1. Note that the status acquisition is performed by causing the utility 68 to query the job management portion 61 and causing the job management portion 61 to return the statuses in the status storage portion 65 to the utility 68.

In step S303, the utility 68 determines whether the acquired statuses include the setting states of automatic power including the automatic power-on setting and the automatic power-off setting. Upon determining that the setting states of automatic power exist (YES in step S303), the process advances to step S304. In step S304, the utility 68 analyzes the status, acquires the setting states of automatic power including the automatic power-on setting and the automatic power-off setting, and advances to step S305. Upon determining that the setting states of automatic power do not exist (NO in step S303), the process directly advances to step S305. In step S305, the utility 68 determines whether the acquired statuses include the setting state of the ink saving setting. Upon determining that the setting state of the ink saving setting exists (YES in step S305), the process advances to step S306. In step S306, the utility 68 analyzes the status, acquires the setting state of the ink saving setting, and advances to step S307. Upon determining that the setting state of the ink saving setting does not exist (NO in step S305), the process directly advances to step S307.

In step S307, the utility 68 acquires the processing state of the special setting acquisition job input by itself by querying the job management portion 61. In step S308, the utility 68 determines based on the acquired processing state of the job whether the special setting acquisition job is completed. Upon determining that the job is not completed (NO in step S308), the process returns to step S302, and the utility 68 acquires the statuses in the status storage portion 65 from the job management portion 61 again. Upon determining that the job is completed (YES in step S308), the process advances to step S309.

In step S309, the utility 68 determines whether the contents stored in the status storage portion 65 of the server PC 1 have been copied to the status storage portion 55, and the utility 68 has acquired the copied contents in step S302 until completion of processing of the special setting acquisition job input by itself. More specifically, the utility 68 determines whether the setting states of automatic power including the automatic power-on setting and the automatic power-off setting copied from the server PC 1 are acquired. Upon determining that the setting states of automatic power are not acquired (NO in step S309), the process advances to step S310. In step S310, the utility 68 acquires the internally held initial settings of automatic power including the automatic power-on setting and the automatic power-off setting, and advances to step S311. Upon determining that setting states of automatic power are acquired (YES in step S309), the process directly advances to step S311.

In step S311, the utility 68 determines whether the setting state of the ink saving setting copied from the server PC 1 is acquired. Upon determining that the setting state is not acquired (NO in step S311), the process advances to step S312. In step S312, the utility 68 acquires the internally held initial setting of the ink saving setting, advances to step S313, and ends the processing. Upon determining that the setting state of the ink saving setting is acquired (YES in step S311), the process directly advances to step S313.

In step S313, the setting states of automatic power acquired in step S304 or S310 or the setting state of the ink saving setting acquired in step S306 or S312 is reflected on the checkbox of the special setting screen 103 displayed at the start of activation of the utility 68. The special setting screen 103 in which the setting states are reflected on the checkboxes is displayed on a display device provided on or connected to the client PC 2.

When the display control processing of step S313 is executed, the processing ends in step S314. When the processing shown in FIG. 9 is executed, special setting processing upon input of a special setting job can be performed by the processing shown in FIG. 7.

FIG. 10 is a flowchart showing special setting acquisition processing of the server PC 1. Note that a program corresponding to the processing shown in the flowchart of FIG. 10 is stored in the ROM of the server PC 1, and the CPU of the server PC 1 executes the program on the RAM, thereby implementing the processing shown in FIG. 10.

When the utility 68 of one of the two client PCs 2 and 3 on the network displays the setting screen of various functions, a special setting acquisition job is input to the job management portion 61 by the process of step S301 in FIG. 9, and transmitted to the job management portion 51 of the server PC 1. When the special setting acquisition job is transmitted from the job management portion 51 of the server PC 1, the utility filter 57 of the server PC 1 executes the special setting acquisition processing.

In step S400, the utility filter 57 starts special setting acquisition processing. In step S401, the utility filter 57 determines whether the status of the printer 4 can be acquired. Upon determining that the status cannot be acquired (NO in step S401), the process advances to step S402, and the utility filter 57 searches the PPD file 54 for the set values of automatic power including the automatic power-on setting and the automatic power-off setting. The search of the PPD file 54 is performed by causing the utility filter 57 to query the job management portion 51 about the set values of various function names. If the set value of the function name of the query is described in the PPD file 54, the job management portion 51 returns the set value to the utility filter 57. If the set value is not described in the PPD file 54, the job management portion 51 returns a value representing the absence to the utility filter 57.

In step S403, the utility filter 57 determines based on the search result whether the set values of automatic power including the automatic power-on setting and the automatic power-off setting exist in the PPD file 54. Upon determining that the set values of automatic power do not exist (NO in step S403), the process advances to step S407, and the utility filter 57 ends the processing. At this time, the setting states of the automatic power-on setting and the automatic power-off setting in the status storage portion 55 are not updated.

Upon determining that the set values of automatic power exist (YES in step S403), the process advances to step S404. In step S404, the utility filter 57 acquires the set values of automatic power including the automatic power-on setting and the automatic power-off setting from the PPD file 54. The various set values acquired from the PPD file 54 here are the setting states by the utility 68 of the client PC 2 that has made the setting finally. In step S406, the utility filter 57 updates the setting states of automatic power including the automatic power-on setting and the automatic power-off setting in the status storage portion 55 based on the set value acquired from the PPD file 54. If the setting states do not exist in the status storage portion 55, the utility filter 57 newly stores the setting states in the status storage portion 55. If the setting states already exist in the status storage portion 55, the utility filter 57 temporarily deletes the setting states and then newly stores the setting states in the status storage portion 55.

Upon determining in step S401 that the status of the printer can be acquired (YES in step S401), the utility filter 57 advances to step S405. In step S405, the utility filter 57 acquires the setting states of automatic power including the automatic power-on setting and the automatic power-off setting from the printer 4 and advances to step S406. In step S406, the utility filter 57 updates the setting states of automatic power including the automatic power-on setting and the automatic power-off setting in the status storage portion 55 based on the setting states acquired from the printer 4. If the setting states do not exist in the status storage portion 55, the utility filter 57 newly stores the setting states in the status storage portion 55. If the setting states already exist in the status storage portion 55, the utility filter 57 temporarily deletes the setting states and then newly stores the setting states in the status storage portion 55.

In step S407, cooperating with the OS of the client PC 2, the OS of the server PC 1 copies the setting states stored in the status storage portion 55 of the server PC 1 to the status storage portion 65 of the client PC 2 that has input the special setting acquisition job. The setting states to be copied include the latest setting states of automatic power and the latest setting state of ink saving by the process of step S406. By the process of step S407 or the process of step S302 in FIG. 9, the latest setting states in the server PC 1 are notified to the utility 68 of the client PC 2.

When the process of step S407 is executed, the server PC 1 ends the processing in step S408.

Note that in the special setting acquisition processing, the utility filter 57 stores the setting states of automatic power including the automatic power-on setting and the automatic power-off setting in the status storage portion 55 of the server PC 1 but not the setting state of the ink saving setting. However, if special setting processing has already been performed, the setting state of the ink saving setting has been stored in the status storage portion 55 of the server PC 1 by the utility filter 57 in step S211 of FIG. 8. When the special setting acquisition job transmitted from the client PC 2 in this setting state is processed by the job management portion 51 of the server PC 1, the setting states in the status storage portion 55 of the server PC 1 are copied to the status storage portion 65 of the client PC 2 by the OS. Hence, the utility 68 of the client PC 2 can acquire the setting states of automatic power including the automatic power-on setting and the automatic power-off setting and the setting state of the ink saving setting copied to the status storage portion 65 of the client PC 2, and reflect them on the various setting checkboxes of the special setting screen 103.

Figure 11:
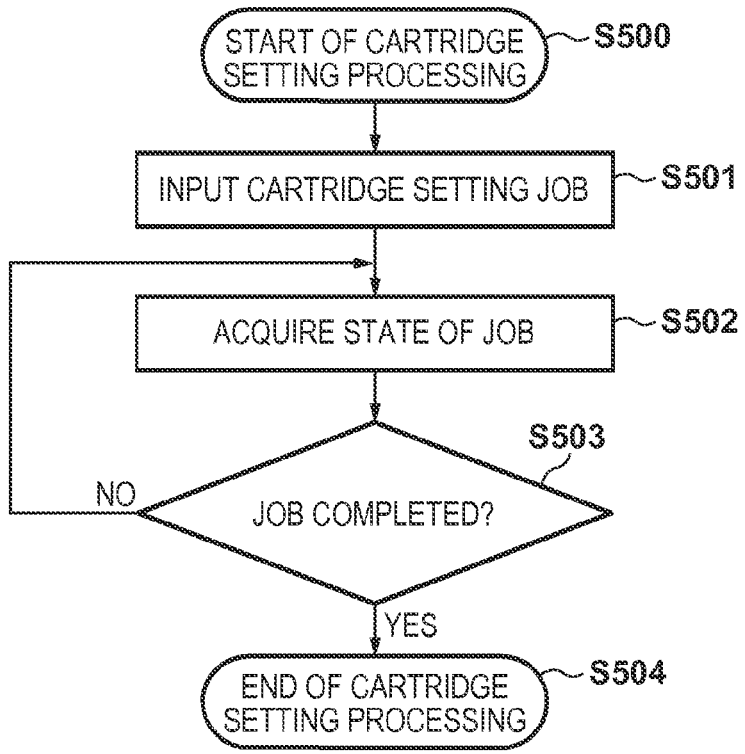
FIG. 11 is a flowchart showing cartridge setting processing of the utility.

FIG. 11 is a flowchart showing cartridge setting processing of the utility 68 of the client PC 2. Note that a program corresponding to the processing shown in the flowchart of FIG. 11 is stored in the ROM of the client PC 2, and the CPU of the client PC 2 executes the program on the RAM, thereby implementing the processing shown in FIG. 11.

When the user presses the apply button 112 in the cartridge setting screen 110, the utility 68 executes the cartridge setting processing. In step S500, the utility 68 starts the cartridge setting processing. In step S501, the utility 68 inputs a cartridge setting job to the job management portion 61. In step S502, the utility 68 acquires the processing state of the cartridge setting job input by itself by querying the job management portion 61. In step S503, the utility 68 determines based on the acquired processing state of the job whether the cartridge setting job is completed. Upon determining that the job is not completed (NO in step S503), the process returns to step S502, and the utility 68 acquires the processing state of the job from the job management portion 61 again. Upon determining that the job is completed (YES in step S503), the process advances to step S504, and the utility 68 ends the processing.

Figure 12:
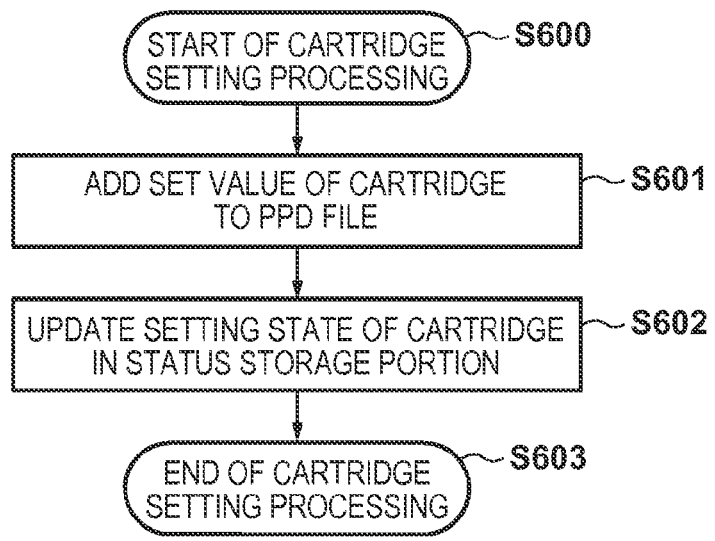
FIG. 12 is a flowchart showing cartridge setting processing of the utility filter.

FIG. 12 is a flowchart showing cartridge setting processing of the utility filter 57 of the server PC 1. Note that a program corresponding to the processing shown in the flowchart of FIG. 12 is stored in the ROM of the server PC 1, and the CPU of the server PC 1 executes the program on the RAM, thereby implementing the processing shown in FIG. 12.

When a cartridge setting job is transmitted from the job management portion 51 of the server PC 1, the utility filter 57 executes the cartridge setting processing. In step S600, the utility filter 57 starts the cartridge setting processing. In step S601, the utility filter 57 adds the set value of the cartridge setting transmitted together with the cartridge setting job to the PPD file 54. The set value of the cartridge setting added to the PPD file 54 is referred to by the print filter 56 at the time of print processing, and the print filter 56 changes the print data generation mode based on the set value. Details of this processing will be described later.

In step S602, the utility filter 57 updates the setting state of the cartridge setting in the status storage portion 55. If the setting state of the cartridge setting does not exist in the status storage portion 55, the utility filter 57 newly stores the setting state in the status storage portion 55. If the setting state of the cartridge setting already exists in the status storage portion 55, the utility filter 57 temporarily deletes the setting state and then newly stores the setting state in the status storage portion 55. The process advances to step S603, and the utility filter 57 ends the processing.

At the end of the processing, the utility filter 57 ends the processing without deleting the setting state of the cartridge setting stored in the status storage portion 55. Hence, the setting state of the cartridge setting remains stored in the status storage portion 55 even when the processing of the utility filter 57 has ended. In the cartridge setting processing, the set value added to the PPD file 54 of the server PC 1 is not reflected on the PPD file 64 of the client PC 2, as in special setting processing. The set value added to the PPD file 54 of the server PC 1 is referred to by the print filter 56 or utility filter 57 acting on the server PC 1 and used to control processing of the filters. On the other hand, the setting state stored in the status storage portion 55 of the server PC 1 is then copied to the status storage portion 65 of the client PC 2 by the OS. The utility 68 of the client PC 2 acquires the setting state from the status storage portion 65 and reflects it on the cartridge setting screen 110. Details of this processing will be described later.

Figure 13:
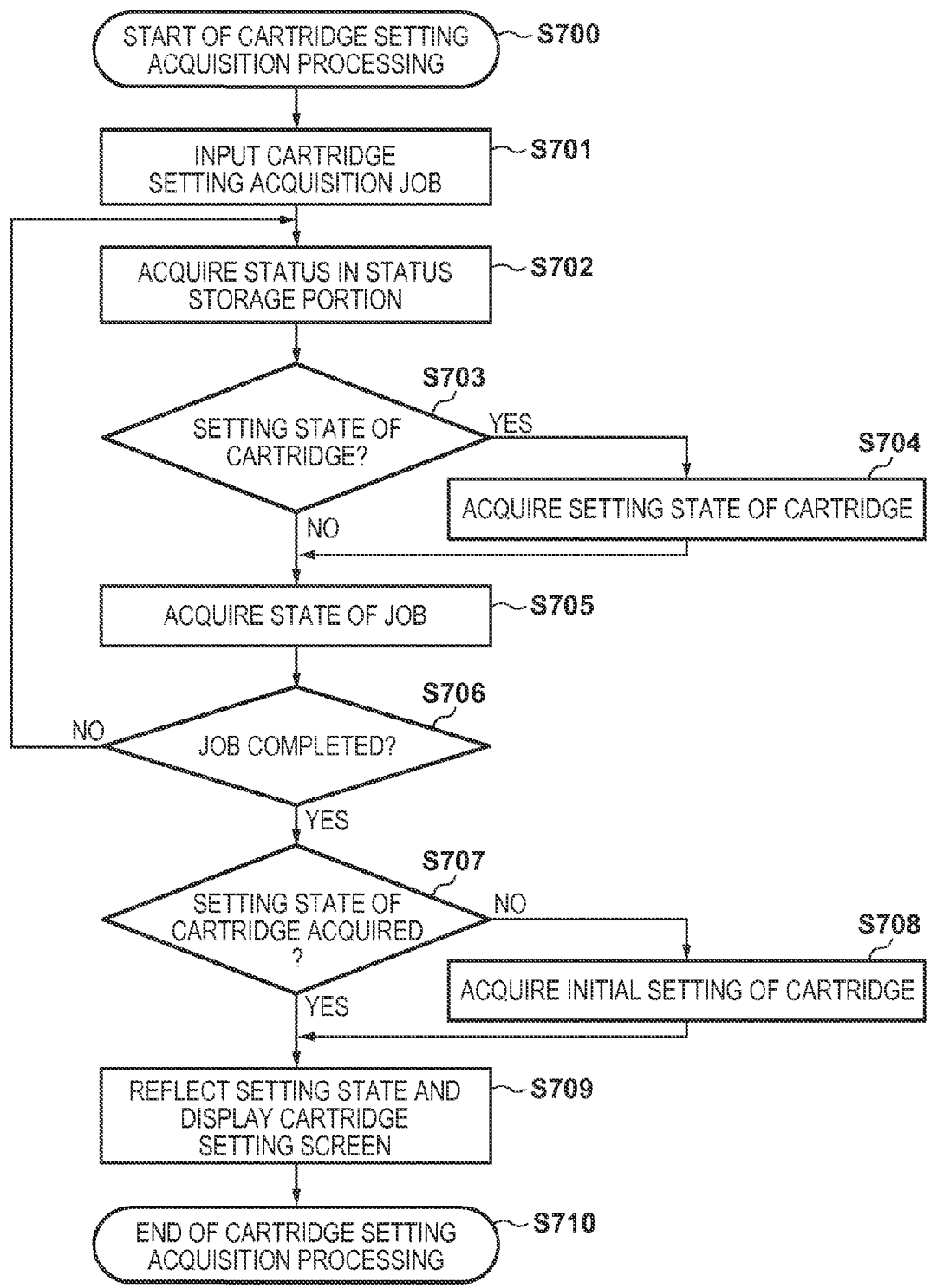
FIG. 13 is a flowchart showing cartridge setting acquisition processing of the utility.

FIG. 13 is a flowchart showing cartridge setting acquisition processing of the utility 68 of the client PC 2. Note that a program corresponding to the processing shown in the flowchart of FIG. 13 is stored in the ROM of the client PC 2, and the CPU of the client PC 2 executes the program on the RAM, thereby implementing the processing shown in FIG. 13.

The utility 68 executes the cartridge setting acquisition processing before displaying the cartridge setting screen 110, and reflects the acquired setting state on the cartridge setting pop-up menu 111. In step S700, the utility 68 starts the cartridge setting acquisition processing. In step S701, the utility 68 inputs a cartridge setting acquisition job to the job management portion 61. In step S702, the utility 68 acquires statuses in the status storage portion 65 via the job management portion 61. The status acquisition is performed by causing the utility 68 to query the job management portion 61 and causing the job management portion 61 to return the statuses in the status storage portion 65 to the utility 68.

In step S703, the utility 68 determines whether the acquired statuses include the setting state of the cartridge setting. Upon determining that the setting state of the cartridge setting exists (YES in step S703), the process advances to step S704. In step S704, the utility 68 analyzes the status, acquires the setting state of the cartridge setting, and advances to step S705. Upon determining that the setting state does not exist (NO in step S703), the process directly advances to step S705. In step S705, the utility 68 acquires the processing state of the cartridge setting acquisition job input by itself by querying the job management portion 61.

In step S706, the utility 68 determines based on the acquired processing state of the job whether the cartridge setting acquisition job is completed. Upon determining that the job is not completed (NO in step S706), the process returns to step S702, and the utility 68 acquires the statuses in the status storage portion 65 from the job management portion 61 again. Upon determining that the job is completed (YES in step S706), the process advances to step S707.

In step S707, the utility 68 determines whether it has acquired the latest setting state of the cartridge setting copied from the status storage portion 55 of the server PC 1 in step S702 until completion of processing of the cartridge setting acquisition job input by itself. Upon determining that the setting state is not acquired (NO in step S707), the process advances to step S708. In step S708, the utility 68 acquires the internally held initial setting of the cartridge setting, advances to step S709, and ends the processing. Upon determining that setting state is acquired (YES in step S707), the process advances to step S709.

In step S709, the setting state of the cartridge setting acquired in step S704 or S708 is reflected on the initial setting of the initial screen of the cartridge setting screen 110. The cartridge setting screen 110 in which the setting state is reflected on the initial setting is displayed on a display device provided on or connected to the client PC 2.

When the display control processing of step S709 is executed, the processing directly advances to step S710, and the utility 68 ends the processing.

Figure 14:
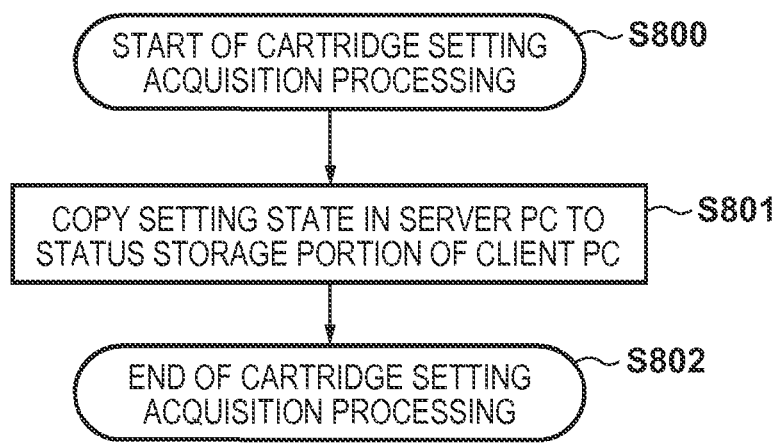
FIG. 14 is a flowchart showing cartridge setting acquisition processing of the utility filter.

FIG. 14 is a flowchart showing cartridge setting acquisition processing of the server PC 1. Note that a program corresponding to the processing shown in the flowchart of FIG. 14 is stored in the ROM of the server PC 1, and the CPU of the server PC 1 executes the program on the RAM, thereby implementing the processing shown in FIG. 14.

When a cartridge setting acquisition job is transmitted from the job management portion 51 of the server PC 1, the server PC 1 starts cartridge setting acquisition processing in step S800. In step S801, cooperating with the OS of the client PC 2, the server PC 1 copies the setting state stored in the status storage portion 55 of the server PC 1 to the status storage portion 65 of the client PC 2 that has input the cartridge setting acquisition job. The process then advances to step S802 to end the processing.

If cartridge setting processing has already been performed, the setting state of the cartridge setting has been stored in the status storage portion 55 of the server PC 1 by the utility filter 57 in step S602 of FIG. 12. When the cartridge setting acquisition job transmitted from the client PC 2 in this setting state is processed by the job management portion 51 of the server PC 1, the setting state of the cartridge setting in the status storage portion 55 of the server PC 1 is copied to the status storage portion 65 of the client PC 2 by the processing of the OS shown in FIG. 14. Hence, the utility 68 of the client PC 2 can acquire the setting state of the cartridge setting copied to the status storage portion 65, and reflect it on the cartridge setting screen 110.

Figure 15:
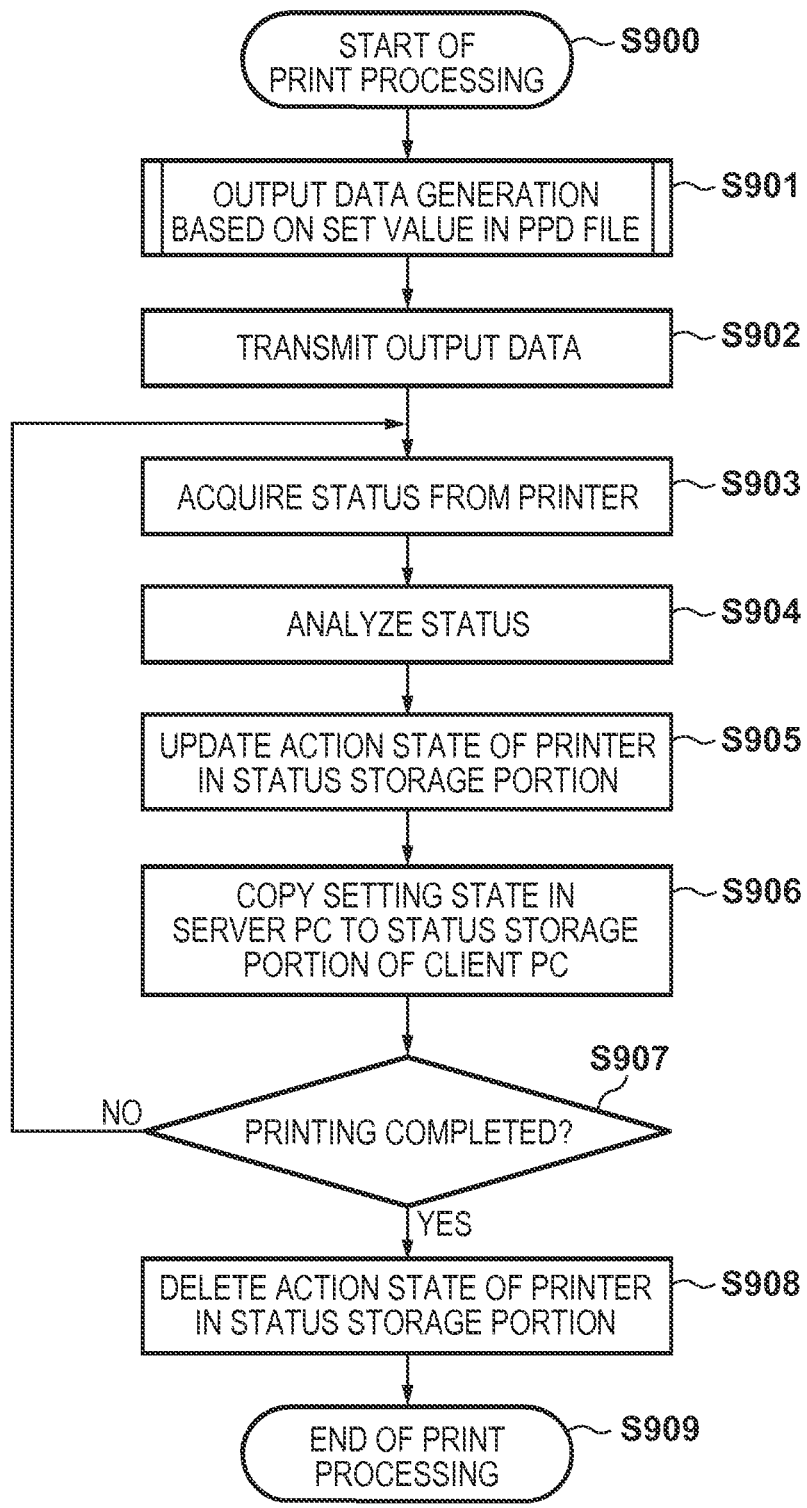
FIG. 15 is a flowchart showing print processing of a print filter.

FIG. 15 is a flowchart showing print processing of the server PC 1. Note that a program corresponding to the processing shown in the flowchart of FIG. 15 is stored in the ROM of the server PC 1, and the CPU of the server PC 1 executes the program on the RAM, thereby implementing the processing shown in FIG. 15.

When a print job is transmitted from the job management portion 51 of the server PC 1, the print filter 56 executes the print processing. In step S900, the print filter 56 starts the print processing. In step S901, the print filter 56 generates output data (print data) based on the set values of the cartridge setting and the ink saving setting added to the PPD file 54. Details of this processing will be described later. In step S902, the print filter 56 transmits the generated output data to the printer 4. Upon receiving the output data, the printer 4 starts printing.

In step S903, the print filter 56 acquires the status from the printer 4. In step S904, the print filter 56 analyzes the acquired status. In step S905, the print filter 56 updates the action state of the printer 4 in the status storage portion 55 based on the result of status analysis. If no error has occurred in the printer 4, the print filter 56 does not store the status. If an error has occurred in the printer 4, the print filter 56 stores the error state in the status storage portion 55. When the error in the printer 4 is solved, the print filter 56 deletes the error state stored in the status storage portion 55. Display messages corresponding to various error states stored by the print filter 56 are described in the PPD file 54 and therefore displayed in the status display region 303 of the job display window 300, as shown in FIG. 6B.

In step S906, the OS of the server PC 1 copies the action state of the printer 4 stored in the status storage portion 55 of the server PC 1 to the status storage portion 65 of the client PC 2. The action state is displayed in the status display region 303 of the job display window 300 of the client PC 2, too.

In step S907, the print filter 56 determines based on the result of status analysis whether printing is completed. Upon determining that printing is not completed (NO in step S907), the print filter 56 returns to step S903, and acquires the status from the printer 4 and analyzes it again. Upon determining that printing is completed (YES in step S907), the process advances to step S908, and the print filter 56 deletes the action state of the printer 4 in the status storage portion 55. If the error state of the printer 4 remains stored in the status storage portion 55 in step S905, the print filter 56 deletes it. If no error state of the printer 4 is stored in the status storage portion 55, the print filter 56 does not perform the deletion processing. After that, the server PC 1 advances to step S909 and ends the processing.

Figure 16:
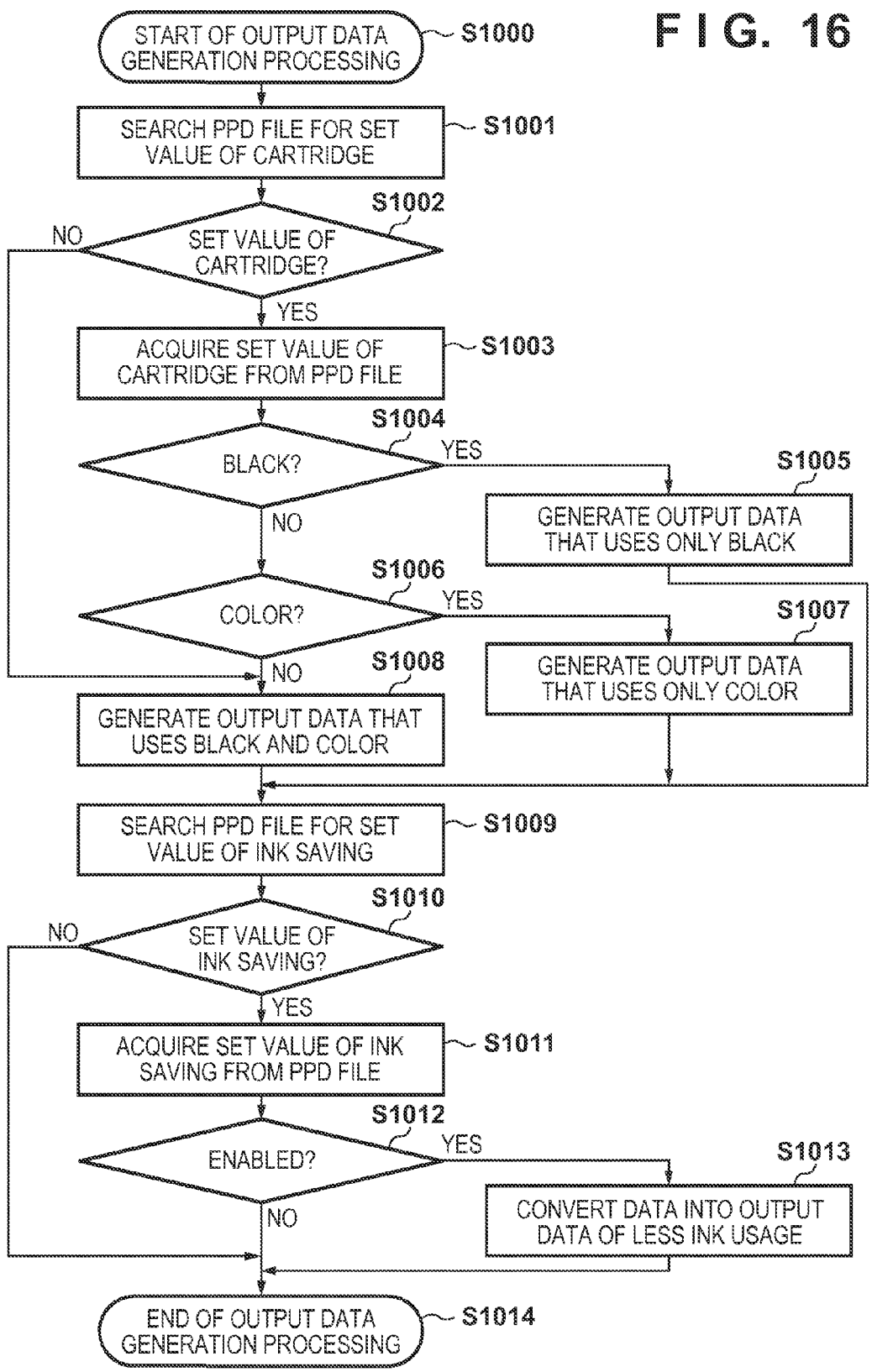
FIG. 16 is a flowchart showing output data generation processing of the print filter.

FIG. 16 is a flowchart showing output data generation processing of the print filter 56 of the server PC 1. Note that a program corresponding to the processing shown in the flowchart of FIG. 16 is stored in the ROM of the server PC 1, and the CPU of the server PC 1 executes the program on the RAM, thereby implementing the processing shown in FIG. 16.

This processing corresponds to details of the process of step S901 in FIG. 15. In step S1000, the print filter 56 starts the output data generation processing. In step S1001, the print filter 56 searches for the set value of the cartridge setting added to the PPD file 54. The search of the PPD file 54 is performed by causing the print filter 56 to query the job management portion 51 about the set values of various function names. If the set value of the function name of the query is described in the PPD file 54, the job management portion 51 returns the set value to the print filter 56. If the set value does not exist in the PPD file 54, the job management portion 51 returns a value representing the absence to the print filter 56.

In step S1002, the print filter 56 determines based on the search result whether the set value of the cartridge setting exists in the PPD file 54. Upon determining that the set value exists (YES in step S1002), the process advances to step S1003, and the print filter 56 acquires the set value of the cartridge setting from the PPD file 54. In steps S1004 and S1006, the print filter 56 determines the set value of the cartridge setting. Upon determining that the set value of the cartridge setting is "black" (YES in step S1004), the process advances to step S1005, and the print filter 56 generates output data that uses only the black cartridge. Upon determining that the set value of the cartridge setting is not "black" but "color" (NO in step S1004 and YES in step S1006), the print filter 56 generates output data that uses only the color cartridge in step S1007. Upon determining that the set value of the cartridge setting is neither "black" nor "color" (NO in step S1004 and NO in step S1006), the process advances to step S1008, and the print filter 56 generates output data that uses both the black cartridge and the color cartridge.

Upon determining in step S1002 that the set value does not exist in the PPD file 54 (NO in step S1002), the process advances to step S1008, and the print filter 56 generates output data that uses both the black cartridge and the color cartridge. In step S1009, the print filter 56 searches for the set value of the ink saving setting added to the PPD file 54. In step S1010, the print filter 56 determines based on the search result whether the set value of the ink saving setting exists in the PPD file 54. Upon determining that the set value of the ink saving setting does not exist (NO in step S1010), the process advances to step S1014, and the print filter 56 ends the output data generation processing. Upon determining that the set value of the ink saving setting exists (YES in step S1010), the process advances to step S1011, and the print filter 56 acquires the set value of the ink saving setting from the PPD file 54.

In step S1012, the print filter 56 determines whether the ink saving setting is enabled. Upon determining that the ink saving setting is enabled (YES in step S1012), the process advances to step S1013, and the print filter 56 converts the output data already generated in one of steps S1005, S1007, and S1008 into output data of less ink usage. The process advances to step S1014, and the print filter 56 ends the output data generation processing. Upon determining that the ink saving setting is not enabled (NO in step S1012), the process advances to step S1014, and the print filter 56 ends the output data generation processing.

FIG. 17 is a view showing a part of the PPD file 54. A description portion of the setting states of various functions of the utility filter 57 and a description portion of display messages are illustrated.

A character string 400 is a description of the automatic power-on setting. When the utility filter 57 notifies the job management portion 51 of the set value of the automatic power-on setting, the job management portion 51 adds the character string 400 to the PPD file 54. In this embodiment, the function name of the automatic power-on setting added to the PPD file 54 is "AutoPowerOn". The set value is 0 when disabled and 1 when enabled.

A character string 401 is a description of the automatic power-off setting. When the utility filter 57 notifies the job management portion 51 of the set value of the automatic power-off setting, the job management portion 51 adds the character string 401 to the PPD file 54. In this embodiment, the function name of the automatic power-off setting added to the PPD file 54 is "AutoPowerOff". The set value is 0 when disabled and 1 when enabled.

A character string 402 is a description of the ink saving setting. When the utility filter 57 notifies the job management portion 51 of the set value of the ink saving setting, the job management portion 51 adds the character string 402 to the PPD file 54. In this embodiment, the function name of the ink saving setting added to the PPD file 54 is "InkSaveMode". The set value is 0 when disabled and 1 when enabled.

A character string 403 is a description of the cartridge setting. When the utility filter 57 notifies the job management portion 51 of the set value of the cartridge setting, the job management portion 51 adds the character string 403 to the PPD file 54. In this embodiment, the function name of the cartridge setting added to the PPD file 54 is "CartridgeSetting". The set value is 1 for "only black", 2 for "only color", and 3 for "both". When the utility filter 57 notifies the job management portion 51 of various function names and set values, the job management portion 51 adds them to the PPD file 54, as shown in FIG. 17.

When the print filter 56 queries the job management portion 51 about set values using various function names, the job management portion 51 returns the set values to the print filter 56 if there are the descriptions of the function names of the query. If there are no descriptions of the function names, the job management portion 51 returns a value representing the absence to the print filter 56.

Character strings 404 to 407 are descriptions of display messages corresponding to various error states. The descriptions of display messages are described in the initial state of the PPD file 54 together with paper sizes or paper types usable in the printer 4 and their initial values. "cupsIPPReason" at the start of each character string represents that the row indicates a description of a display message. In this embodiment, display messages corresponding to a paper-out error state, an ink-out error state, a communication error state, and other error states are described in the PPD file 54.

The character string 404 is a description of the display message of a paper-out error state. "com.cij.paper-out-error" is a status representing a paper-out error state stored in the status storage portion 55 by the utility filter 57 or the print filter 56. "Paper is out" is a display message corresponding to the paper-out error state.

The character string 405 is a description of the display message of an ink-out error state. "com.cij.ink-out-error" is a status representing an ink-out error state stored in the status storage portion 55 by the utility filter 57 or the print filter 56. "Ink is out" is a display message corresponding to the ink-out error state.

The character string 406 is a description of the display message of a communication error state. "com.cij.off-line-error" is a status representing a communication error state stored in the status storage portion 55 by the utility filter 57 or the print filter 56. "Unable to communicate with printer" is a display message corresponding to the communication error state.

The character string 407 is a description of the display message of other error states. "com.cij.other-error" is a status representing other error states stored in the status storage portion 55 by the utility filter 57 or the print filter 56. "Error has occurred" is a display message corresponding to other error states.

Based on a status acquired from the printer 4, the utility filter 57 or the print filter 56 stores the status representing the error state in the status storage portion 55. The job display portion 53 queries the job management portion 51 about a corresponding display message using the status representing the error state. If the description of the display message of the error state of the query exists in the PPD file 54, the job management portion 51 returns it to the job display portion 53. If the description of the display message of the error state does not exist in the PPD file 54, the job management portion 51 returns a value representing the absence to the job display portion 53.

As described above, according to the first embodiment, the utility 68 acting on the client PC 2 can acquire, from the server PC 1, the setting states of print processing in the server PC 1 or the printer 4 connected to the server PC 1. As shown in FIGS. 9 and 10, in this embodiment, when acquiring the setting states, the client PC 2 transmits a special setting acquisition job to the server PC 1, and the server PC 1 stores the setting states of the printer 4 or printer driver in the status storage portion 55, thereby causing the client PC 2 to acquire the setting states.

The above-described job transmission by the client PC 2 and setting state storage in the status storage portion 55 by the server PC 1 are also used to notify the action state of the printer 4 by print job transmission, as described with reference to FIG. 15.

Hence, according to the first embodiment, it is possible to notify the client PC 2 of the setting states of the printer 4 or the printer driver of the server PC 1 by the arrangement common to the notification of the printer action state at the time of printing. For this reason, the client PC 2 and the server PC 1 can appropriately communicate the setting states without an arrangement for setting state communication which is different from the notification of the action state of the printer 4.

Hence, even when a plurality of client PCs 2 are connected to the network, and the settings are changed from the utility 68 acting on another client PC, the utility 68 can acquire effective setting states that are set finally from the server PC 1 and reflect them on various setting screens.

As described above, in the first embodiment, the setting state of the print environment of a server apparatus is synchronized between the server apparatus and a client apparatus at an appropriate timing. In other words, the server apparatus and the client apparatus share the setting state of the print environment.

With this arrangement, the user can confirm the presence/absence of an error such as ink-out or paper-out and a situation where an error may occur in advance on the client PC 2 as the print environment of the server PC 1, optimum printing suitable for the situation can be executed.

Note that status copy processing by the OS of the server PC 1 or the OS of the client PC 2 need not always be performed at the timing of step S407 of FIG. 10, step S801 of FIG. 14, or step S906 of FIG. 15 described above. For example, the OS of the server PC 1 may periodically transmit information stored in the status storage portion 55 to the client PC 2. Alternatively, the OS of the server PC 1 may monitor the status storage portion 55, and if updating is performed, notify the client PC 2 of the contents after updating.

Setting acquisition job issuance by the client PC 2 need not always be performed at the time of activation of the utility 68. For example, the setting acquisition job may be issued when a user instruction is input in the screen of the utility 68.

<Second Embodiment>

In the first embodiment, when a special setting job is transmitted from the job management portion 51, the utility filter 57 of the server PC 1 stores the setting state of the ink saving setting in the status storage portion 55. Additionally, in the first embodiment, when a cartridge setting job is transmitted from the job management portion 51, the utility filter 57 of the server PC 1 stores the setting state of the cartridge setting in the status storage portion 55.

In the second embodiment, however, an arrangement will be described in which a utility filter 57 of a server PC 1 stores, in a status storage portion 55, the setting state of the ink saving setting even when a special setting acquisition job is transmitted from a job management portion 51. Additionally, in the second embodiment, an arrangement will be described in which the utility filter 57 of the server PC 1 stores, in the status storage portion 55, the setting state of the cartridge setting even when a cartridge setting acquisition job is transmitted from the job management portion 51.

Note that in the second embodiment, the overall arrangement of a printing system, the operation windows of a utility, dialogues during processing, the windows of job display portions, and the utility setting description portions of PPD files are the same as in the first embodiment, and a description thereof will be omitted. In the second embodiment, the procedures of special setting processing, special setting acquisition processing, cartridge setting processing, and cartridge setting acquisition processing of the utility, special setting processing and cartridge setting processing of the utility filter, and print processing and output data generation processing of a print filter are also the same as in the first embodiment, and a description thereof will be omitted.

Figure 18:
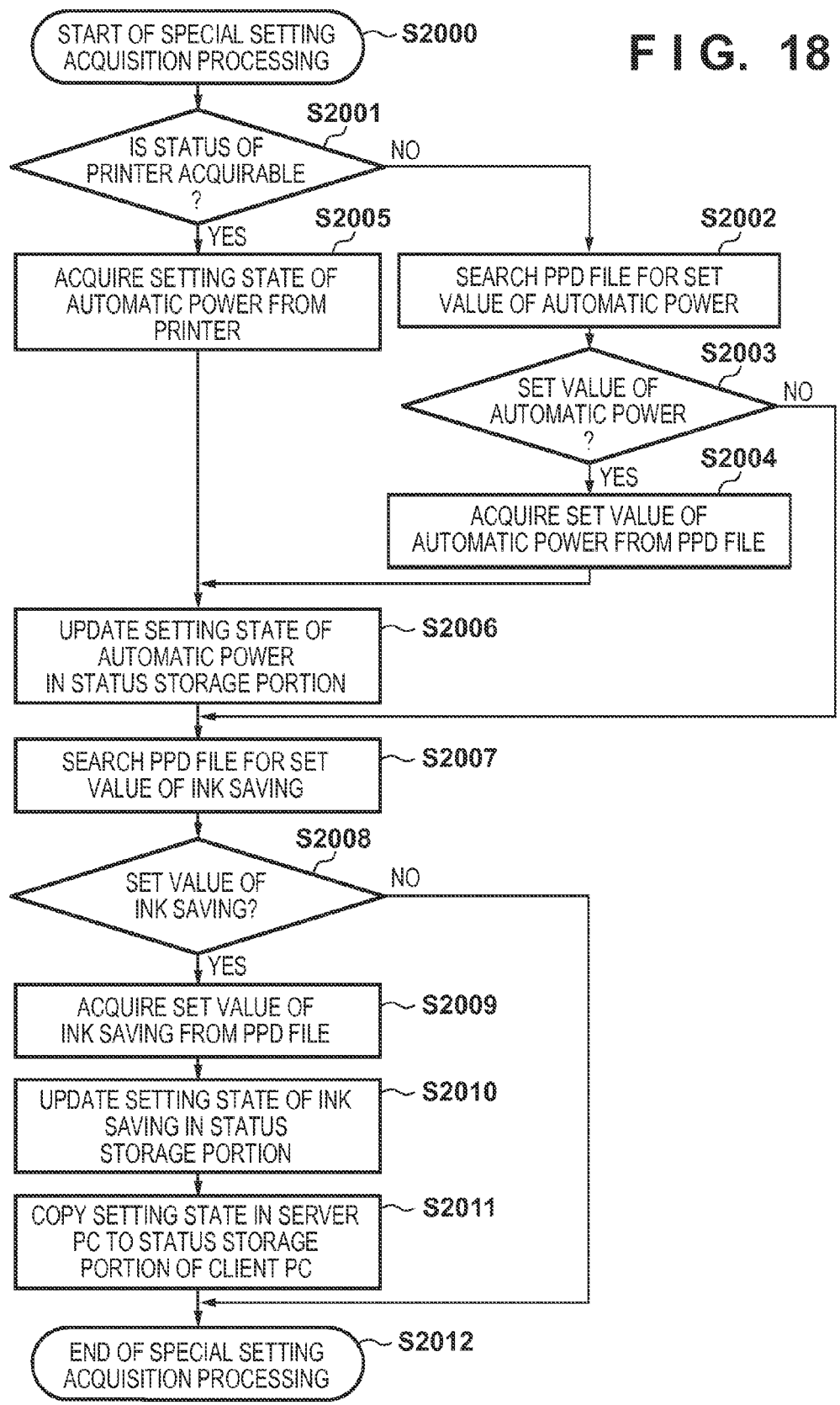
FIG. 18 is a flowchart showing special setting acquisition processing of a utility filter.

FIG. 18 is a flowchart showing special setting acquisition processing of the server PC 1. Note that a program corresponding to the processing shown in the flowchart of FIG. 18 is stored in the ROM of the server PC 1, and the CPU of the server PC 1 executes the program on the RAM, thereby implementing the processing shown in FIG. 18.

When a special setting acquisition job is transmitted from the job management portion 51 of the server PC 1, the utility filter 57 executes the special setting acquisition processing. In step S2000, the utility filter 57 starts the special setting acquisition processing. In step S2001, the utility filter 57 determines whether the status of a printer 4 can be acquired. Upon determining that the status cannot be acquired (NO in step S2001), the process advances to step S2002, and the utility filter 57 searches a PPD file 54 for the set values of automatic power including the automatic power-on setting and the automatic power-off setting. The search of the PPD file 54 is performed by causing the utility filter 57 to query the job management portion 51 about the set values of various function names. If the set value of the function name of the query is described in the PPD file 54, the job management portion 51 returns the set value to the utility filter 57. If the set value is not described in the PPD file 54, the job management portion 51 returns a value representing the absence to the utility filter 57.

In step S2003, the utility filter 57 determines based on the search result whether the set values of automatic power including the automatic power-on setting and the automatic power-off setting exist in the PPD file 54. Upon determining that the set values do not exist (NO in step S2003), the process advances to step S2007. At this time, the setting states of the automatic power-on setting and the automatic power-off setting in the status storage portion 55 are not updated.

Upon determining that the set value exists (YES in step S2003), the process advances to step S2004. In step S2004, the utility filter 57 acquires the set values of automatic power including the automatic power-on setting and the automatic power-off setting from the PPD file 54, and advances to step S2006. In step S2006, the utility filter 57 updates the setting states of automatic power including the automatic power-on setting and the automatic power-off setting in the status storage portion 55 based on the set value acquired from the PPD file 54. If the setting states do not exist in the status storage portion 55, the utility filter 57 newly stores the setting states in the status storage portion 55. If the setting states already exist in the status storage portion 55, the utility filter 57 temporarily deletes the setting states and then newly stores the setting states in the status storage portion 55. The process then advances to step S2007.

Upon determining that the status can be acquired (YES in step S2001), the process advances to step S2005. In step S2005, the utility filter 57 acquires the setting states of automatic power including the automatic power-on setting and the automatic power-off setting from the printer 4 and advances to step S2006. In step S2006, the utility filter 57 updates the setting states of automatic power including the automatic power-on setting and the automatic power-off setting in the status storage portion 55 based on the setting states acquired from the printer 4. If the setting states do not exist in the status storage portion 55, the utility filter 57 newly stores the setting states in the status storage portion 55. If the setting states already exist in the status storage portion 55, the utility filter 57 temporarily deletes the setting states and then newly stores the setting states in the status storage portion 55. The process then advances to step S2007.

In step S2007, the utility filter 57 searches the PPD file 54 for the set value of the ink saving setting. In step S2008, the utility filter 57 determines based on the search result whether the set value of the ink saving setting exists in the PPD file 54. Upon determining that the set value does not exist (NO in step S2008), the process advances to step S2011, and the utility filter 57 ends the processing. At this time, the setting state of the ink saving setting in the status storage portion 55 is not updated.

Upon determining that the set value exists (YES in step S2008), the utility filter 57 advances to step S2009. In step S2009, the utility filter 57 acquires the set value of the ink saving setting from the PPD file 54. In step S2010, the utility filter 57 updates the setting state of the ink saving setting in the status storage portion 55 based on the set value acquired from the PPD file 54. If the setting state of the ink saving setting does not exist in the status storage portion 55, the utility filter 57 newly stores the setting state in the status storage portion 55. If the setting state of the ink saving setting already exists in the status storage portion 55, the utility filter 57 temporarily deletes the setting state and then newly stores the setting state in the status storage portion 55.

In step S2011, cooperating with the OS of a client PC 2, the OS of the server PC 1 copies the setting states stored in the status storage portion 55 of the server PC 1 to a status storage portion 65 of the client PC 2 that has input the special setting acquisition job. The setting states to be copied include the latest setting states of automatic power and the latest setting state of ink saving.

When the process of step S2011 is executed, the server PC 1 advances to step S2012, and the utility filter 57 ends the processing.

In the second embodiment, if the set value of the ink saving setting exists in the PPD file 54, the utility filter 57 updates the setting state of the ink saving setting in the status storage portion 55 not only by special setting processing but also by the special setting acquisition processing. Hence, when the special setting acquisition job is input at the time of display of a special setting screen 103 by a utility 68 of the client PC 2, the setting state of the ink saving setting in the status storage portion 55 is updated in the special setting acquisition processing.

Figure 19:
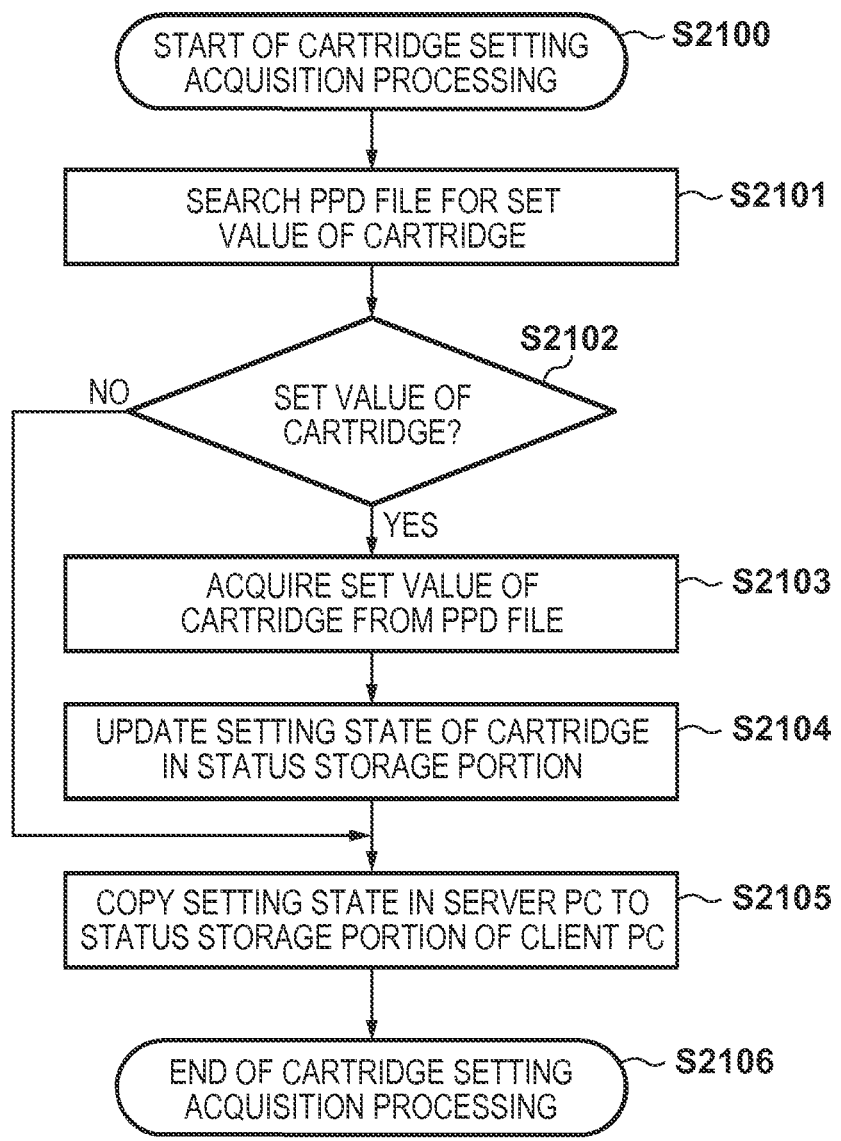
FIG. 19 is a flowchart showing cartridge setting acquisition processing of the utility filter.

FIG. 19 is a flowchart showing cartridge setting acquisition processing of the utility filter 57 of the server PC 1. Note that a program corresponding to the processing shown in the flowchart of FIG. 19 is stored in the ROM of the server PC 1, and the CPU of the server PC 1 executes the program on the RAM, thereby implementing the processing shown in FIG. 19.

When a cartridge setting acquisition job is transmitted from the job management portion 51 of the server PC 1, the utility filter 57 executes the cartridge setting acquisition processing. In step S2100, the utility filter 57 starts cartridge setting acquisition processing. In step S2101, the utility filter 57 searches the PPD file 54 for the set value of the cartridge setting. In step S2102, the utility filter 57 determines based on the search result whether the set value of the cartridge setting exists in the PPD file 54.

Upon determining that the set value does not exist (NO in step S2102), the process advances to step S2105, and the utility filter 57 ends the processing. At this time, the setting state of the cartridge setting in the status storage portion 55 is not updated. Upon determining that the set value exists (YES in step S2102), the utility filter 57 advances to step S2103. In step S2103, the utility filter 57 acquires the set value of the cartridge setting from the PPD file 54. In step S2104, the utility filter 57 updates the setting state of the cartridge setting in the status storage portion 55 based on the set value acquired from the PPD file 54. If the setting state of the cartridge setting does not exist in the status storage portion 55, the utility filter 57 newly stores the setting state in the status storage portion 55. If the setting state of the cartridge setting already exists in the status storage portion 55, the utility filter 57 temporarily deletes the setting state and then newly stores the setting state in the status storage portion 55.

In step S2105, cooperating with the OS of the client PC 2, the OS of the server PC 1 copies the setting states stored in the status storage portion 55 of the server PC 1 to the status storage portion 65 of the client PC 2 that has input the cartridge setting acquisition job.

When the process of step S2105 is executed, the server PC 1 ends the processing in step S2106.

In the second embodiment, if the set value of the cartridge setting exists in the PPD file 54, the utility filter 57 updates the setting state of the cartridge setting in the status storage portion 55 not only by cartridge setting processing but also by the cartridge setting acquisition processing. Hence, when the cartridge setting acquisition job is input at the time of display of a cartridge setting screen 110 by the utility 68 of the client PC 2, the setting state of the cartridge setting in the status storage portion 55 is updated in the cartridge setting acquisition processing.

As described above, according to the second embodiment, not only when the utility 68 acting on the client PC 2 sets the print environment of the server PC 1 or the printer 4 connected to the server PC 1 but also when the utility 68 acquires the setting states, the setting states in the status storage portion 55 are updated. Hence, even when the setting states are deleted by the job management portion 51 after setting, the utility 68 can acquire the setting states when displaying various setting screens and reflect the setting states on the setting screens.

<Third Embodiment>

In the first and second embodiments, the utility 68 of the client PC 2 inputs various setting acquisition jobs, thereby acquiring the setting states of print processing of the server PC 1 or the printer 4 connected to the server PC 1 and displaying them on the screen.

In the third embodiment, however, an arrangement will be described in which a print setting control portion 67 of a client PC 2 inputs a job, as in the first and second embodiments, thereby acquiring settings that can be designated when requesting a printer 4 connected to a server PC 1 to do printing and displaying the settings in a print setting dialogue.

Note that in the third embodiment, the overall arrangement of a printing system and the windows of job display portions are the same as in the first embodiment, and a description thereof will be omitted.

Figure 20:
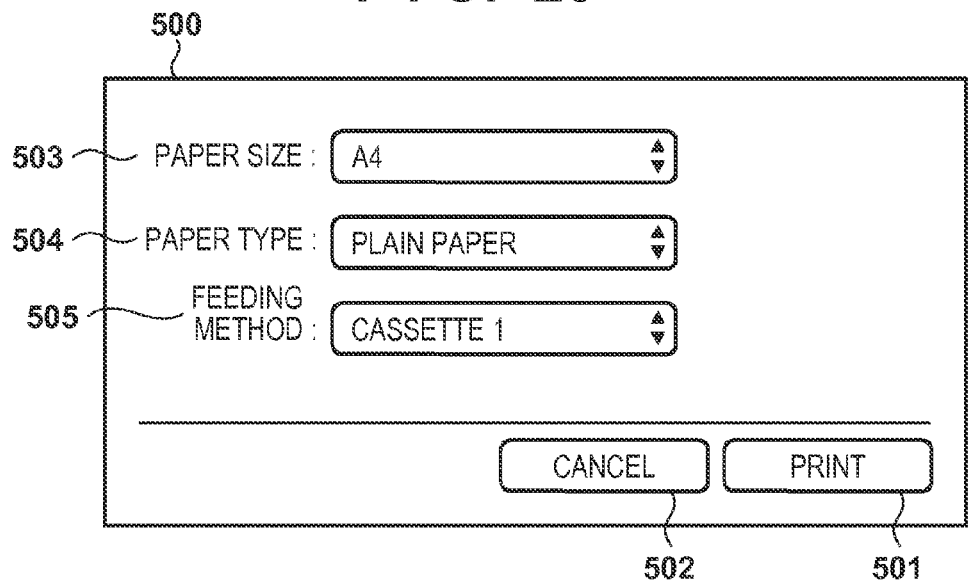
FIG. 20 is a view showing the print setting dialogue of a print setting control portion.

FIG. 20 is a view showing a print setting dialogue 500 of the print setting control portion 67 of the client PC 2.

When the user is to print data created by a print application 66 on the client PC 2, the print setting control portion 67 displays the print setting dialogue 500 and prompts the user to do various print settings. The user can input a print job to a job management portion 61 by a print button 501. The user can also cancel printing and close the print setting dialogue 500 by a cancel button 502.

The user can also set the size of paper to be used in printing by a paper size setting pop-up menu 503. The paper size setting pop-up menu 503 has items "A4", "A5", "B5", "L", and "postcard", and the user can set one of them. A4 is set in the initial state when the print setting dialogue 500 is opened.

The user can also set the type of paper to be used in printing by a paper type setting pop-up menu 504. The paper type setting pop-up menu 504 has items "plain paper", "photo paper", and "postcard", and the user can set one of them. Plain paper is set in the initial state when the print setting dialogue 500 is opened.

The user can also set a paper feed cassette to be used in printing by a feeding method setting pop-up menu 505. In this embodiment, for example, the printer 4 to which two cassettes can be attached is assumed. In the initial state, one cassette is attached to the printer 4. Another cassette can additionally be attached. If the additional cassette is not attached to the printer 4, the feeding method setting pop-up menu 505 has only an item "cassette 1". If the additional cassette is attached to the printer 4, the feeding method setting pop-up menu has items "cassette 1" and "cassette 2", and the user can set one of them. Independently of whether the additional cassette is attached to the printer 4, cassette 1 is set in the initial state when the print setting dialogue 500 is opened.

When displaying the print setting dialogue 500, the print setting control portion 67 displays paper feed cassettes that can currently be designated for the printer 4 in the items of the feeding method setting pop-up menu 505, thereby presenting the current cassette attachment state to the user. At this time, the print setting control portion 67 inputs a cassette attachment state acquisition job to the job management portion 61. The cassette attachment state acquisition job is processed and transmitted to a job management portion 51 of the server PC 1, like a setting job or a setting acquisition job input by a utility 68.

The job management portion 51 of the server PC 1 extracts the cassette attachment state acquisition job from a print queue 62 and transmits it to a utility filter 57. After that, the utility filter 57 processes the cassette attachment state acquisition job. Details of this processing will be described later.

When cassette attachment state acquisition is completed after job input, the print setting control portion 67 reflects the acquired attachment state on the items of the feeding method setting pop-up menu 505 in the print setting dialogue 500. If the cassette attachment state cannot be acquired, only cassette 1 is displayed in the item of the feeding method setting pop-up menu 505 as the initial state.

Figure 21:
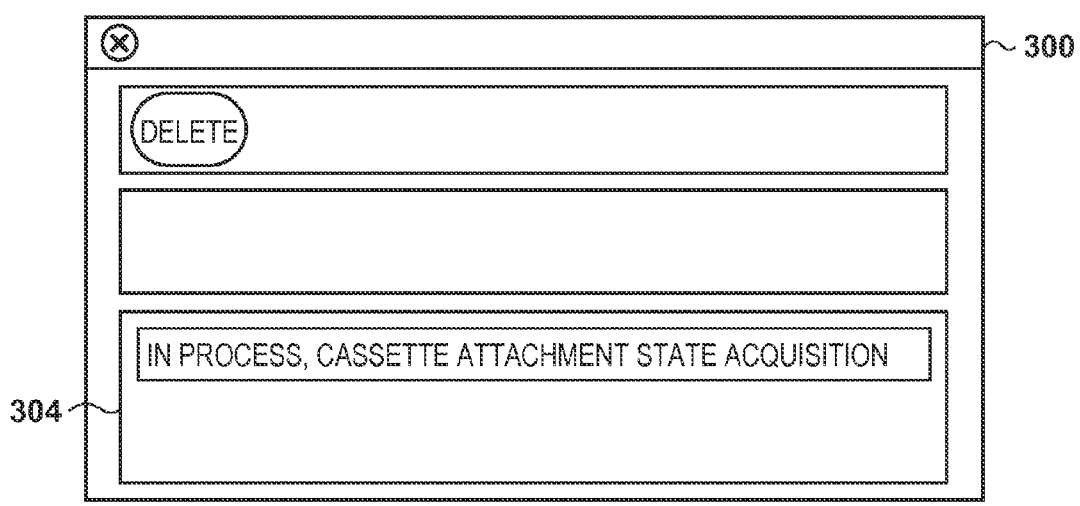
FIG. 21 is a view showing the window of a job display portion.

FIG. 21 shows a job display window 300 that is displayed when the print setting control portion 67 has input a cassette attachment state acquisition job in accordance with display of the print setting dialogue 500. The cassette attachment state acquisition job under processing is displayed in a job display region 304. At this time, the name "cassette attachment state acquisition" of the job input by the print setting control portion 67 is displayed.

Figure 22:
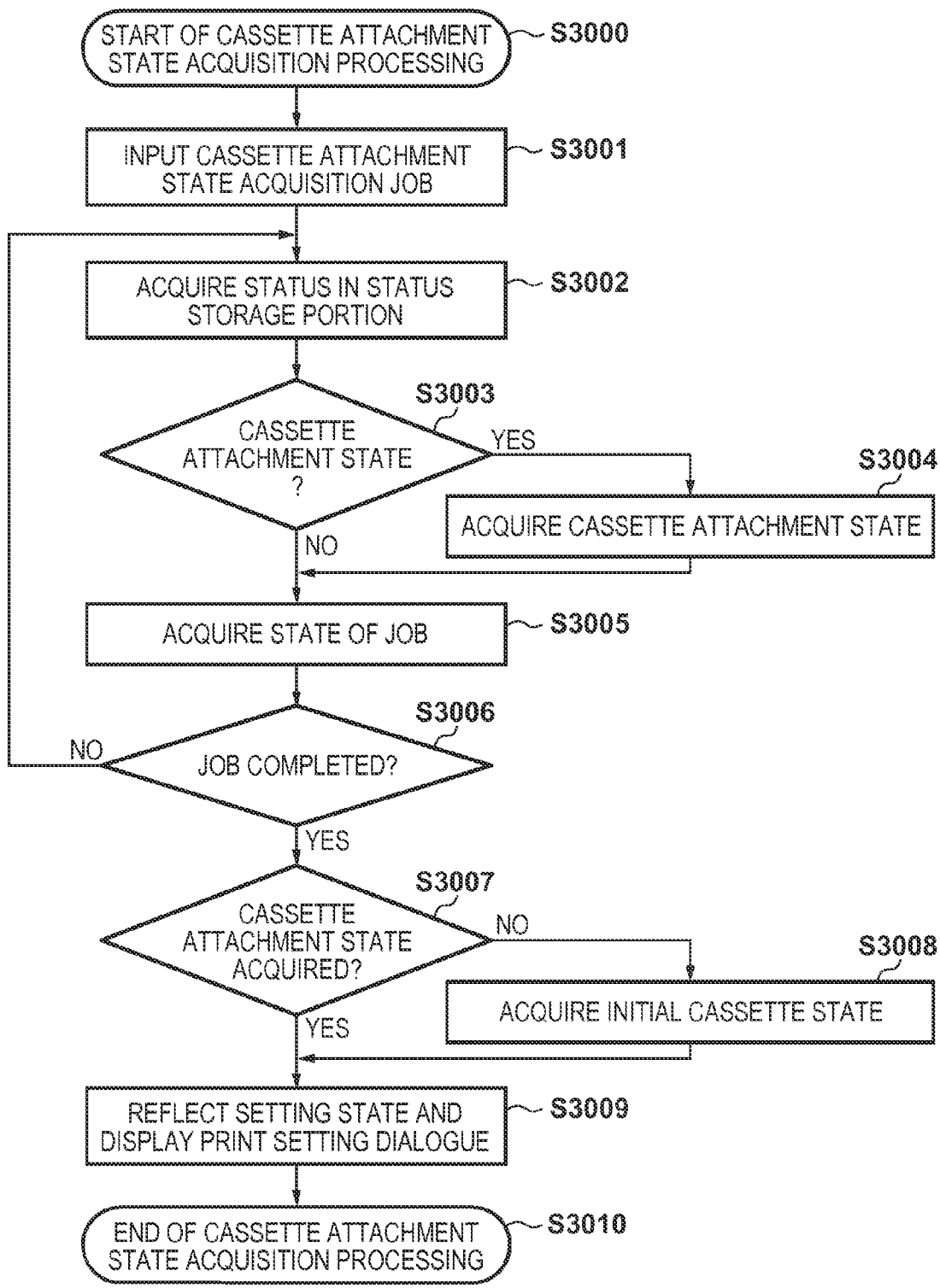
FIG. 22 is a flowchart showing cassette attachment state acquisition processing of the print setting control portion.

FIG. 22 is a flowchart showing cassette attachment state acquisition processing of the print setting control portion 67 of the client PC 2. Note that a program corresponding to the processing shown in the flowchart of FIG. 22 is stored in the ROM of the client PC 2, and the CPU of the client PC 2 executes the program on the RAM, thereby implementing the processing shown in FIG. 22.

The print setting control portion 67 executes the cassette attachment state acquisition processing before displaying the print setting dialogue 500, and reflects the acquired cassette attachment state on the feeding method setting pop-up menu 505. In step S3000, the print setting control portion 67 starts the cassette attachment state acquisition processing. In step S3001, the print setting control portion 67 inputs a cassette attachment state acquisition job to the job management portion 61. In step S3002, the print setting control portion 67 acquires statuses in a status storage portion 65 via the job management portion 61. The status acquisition is performed by causing the print setting control portion 67 to query the job management portion 61 and causing the job management portion 61 to return the statuses in the status storage portion 65 to the print setting control portion 67.

In step S3003, the print setting control portion 67 determines whether the acquired statuses include the cassette attachment state. Upon determining that the cassette attachment state exists (YES in step S3003), the process advances to step S3004. The print setting control portion 67 analyzes the status, acquires the cassette attachment state, and advances to step S3005. Upon determining that the setting state does not exist (NO in step S3003), the process directly advances to step S3005. In step S3005, the print setting control portion 67 acquires the processing state of the job input by itself by querying the job management portion 61. In step S3006, the print setting control portion 67 determines based on the acquired processing state of the job whether the cassette attachment state acquisition job is completed. Upon determining that the job is not completed (NO in step S3006), the process returns to step S3002, and the print setting control portion 67 acquires the statuses in the status storage portion 65 from the job management portion 61 again. Upon determining that the job is completed (YES in step S3006), the process advances to step S3007.

In step S3007, the print setting control portion 67 determines whether it has acquired the latest cassette attachment state in the server PC 1 copied by the OS until completion of processing of the cassette attachment state acquisition job input by itself. Upon determining that the cassette attachment state is not acquired (NO in step S3007), the process advances to step S3008. In step S3008, the print setting control portion 67 acquires the internally held initial state of cassette attachment, advances to step S3009, and ends the processing. Upon determining that cassette attachment state is acquired (YES in step S3007), the process advances to step S3009.

In step S3009, the cassette attachment state acquired in step S3004 or S3008 is reflected on the "feeding method" in the print setting dialogue 500. The print setting dialogue is displayed on a display device provided on or connected to the client PC 2.

When the display control processing of step S3009 is executed, the processing ends in step S3010.

Figures 23, 24:
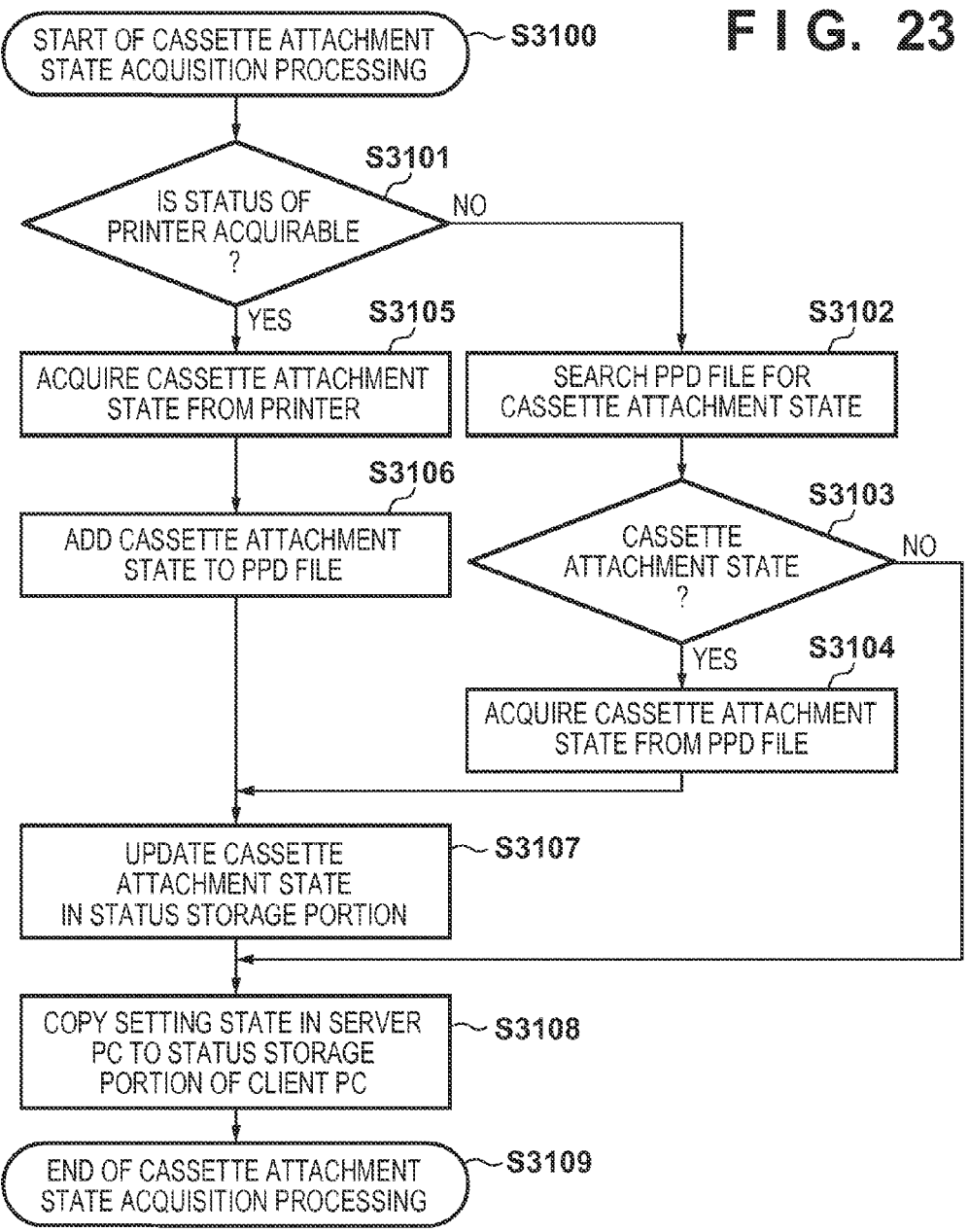
FIG. 23 is a flowchart showing cassette attachment state acquisition processing of a utility filter.
FIG. 24 is a view showing a description portion of a PPD file about a cassette attachment state.

FIG. 23 is a flowchart showing cassette attachment state acquisition processing of the server PC 1. Note that a program corresponding to the processing shown in the flowchart of FIG. 23 is stored in the ROM of the server PC 1, and the CPU of the server PC 1 executes the program on the RAM, thereby implementing the processing shown in FIG. 23.

When a cassette attachment state acquisition job is transmitted from the job management portion 51 of the server PC 1, the utility filter 57 of the server PC 1 executes the cassette attachment state acquisition processing. In step S3100, the utility filter 57 starts the cassette attachment state acquisition processing. In step S3101, the utility filter 57 determines whether the status of the printer 4 can be acquired. Upon determining that the status cannot be acquired (NO in step S3101), the process advances to step S3102, and the utility filter 57 searches the PPD file 54 for each cassette attachment state. The search of the PPD file 54 is performed by causing the utility filter 57 to query the job management portion 51 about the attachment state of each cassette name. If the attachment state of the cassette name of the query is described in the PPD file 54, the job management portion 51 returns the attachment state to the utility filter 57. If the attachment state is not described in the PPD file 54, the job management portion 51 returns a value representing the absence to the utility filter 57.

In step S3103, the utility filter 57 determines based on the search result whether the cassette attachment state exists in the PPD file 54. Upon determining that the cassette attachment state does not exist (NO in step S3103), the process advances to step S3108, and the utility filter 57 ends the processing. At this time, the cassette attachment state in the status storage portion 55 is not updated.

Upon determining that the cassette attachment state exists (YES in step S3103), the process advances to step S3104. In step S3104, the utility filter 57 acquires the cassette attachment state from the PPD file 54. The process advances to step S3107, and the utility filter 57 updates the cassette attachment state in the status storage portion 55 based on the attachment state acquired from the PPD file 54. If the cassette attachment state does not exist in the status storage portion 55, the utility filter 57 newly stores the attachment state in the status storage portion 55. If the cassette attachment state already exists in the status storage portion 55, the utility filter 57 temporarily deletes the cassette attachment state and then newly stores the attachment state in the status storage portion 55.

Upon determining that the status can be acquired (YES in step S3101), the process advances to step S3105. In step S3105, the utility filter 57 acquires the cassette attachment state from the printer 4 and advances to step S3106. In step S3106, the utility filter 57 adds each cassette attachment state to the PPD file 54 based on the cassette attachment state acquired from the printer 4. If the utility filter 57 cannot acquire the status from the printer 4 when acquiring the cassette attachment state from the PPD file 54 again, the cassette attachment state added to the PPD file is referred and used as the cassette attachment state.

In step S3107, the utility filter 57 updates the cassette attachment state in the status storage portion 55 based on the attachment state acquired from the printer 4. If the cassette attachment state does not exist in the status storage portion 55, the utility filter 57 newly stores the attachment state in the status storage portion 55. If the cassette attachment state already exists in the status storage portion 55, the utility filter 57 temporarily deletes the cassette attachment state and then newly stores the attachment state in the status storage portion 55.

In step S3108, cooperating with the OS of the client PC 2, the OS of the server PC 1 copies the setting state stored in the status storage portion 55 of the server PC 1 to the status storage portion 65 of the client PC 2 that has input the cassette attachment state acquisition job.

When the process of step S3108 is executed, the server PC 1 ends the processing in step S3109.

FIG. 24 is a view showing a description portion of the cassette attachment state in the PPD file 54.

A character string 600 is a description of the cassette attachment state. When the utility filter 57 notifies the job management portion 51 of the cassette attachment state, the job management portion 51 adds the character string 600 to the PPD file 54. In this embodiment, cassette names added to the PPD file 54 are "PaperFeeder1" and "PaperFeeder2". "Yes" is set in an attached state, and "No" is set in an unattached state. When the utility filter 57 notifies the job management portion 51 of the cassette names and attachment states, the job management portion 51 adds them to the PPD file 54, as shown in FIG. 24. When the utility filter 57 queries the job management portion 51 about the attachment states using the cassette names, the job management portion 51 returns the attachment states to the utility filter 57 if there are the descriptions of the cassette names of the query. If there are no descriptions of the cassette names, the job management portion 51 returns a value representing the absence to the utility filter 57.

As described above, according to the third embodiment, the print setting control portion 67 acting on the client PC 2 can acquire, from the server PC 1, the cassette attachment state in the printer 4 connected to the server PC 1 and reflect it on the print setting dialogue 500.

Note that in the above embodiments, a printing apparatus has been exemplified as a predetermined apparatus whose setting state or action state is acquired. However, the present invention is not limited to this. The processing of the embodiments can be applied to various kinds of apparatuses, for example, a scanner that reads an original or a display apparatus such as a TV set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-268094, filed Dec. 25, 2013, which is hereby incorporated by reference wherein in its entirety.

What is claimed is:

1. An information processing apparatus comprising at least one processor configured to receive a job sent from a client apparatus,
   wherein at least on processor stores information in a first storage portion and a second storage portion, the first storage portion holding information to be acquired, when the job is received, by the client apparatus which has sent the received job and the second storage portion holding information which (i) is not to be acquired, when the job is received, by the client apparatus which has sent the received job and (ii) is to be acquired, only when a printing apparatus connected to the information processing apparatus is registered by the client apparatus, by the client apparatus which has registered the printing apparatus,
   wherein at least one processor stores, in the first storage portion and the second storage portion, information relating to an action mode set based on a setting job for setting an action mode of the printing apparatus, the setting job being received from the client apparatus,
   wherein, when a setting acquisition job is received from another client apparatus different from the client apparatus after the setting job is received from the client apparatus, information held in the first storage portion and relating to the action mode set based on the setting job received from the client apparatus is acquired by the another client apparatus.

2. The apparatus according to claim 1, wherein a screen including the information concerning the action mode is displayed on a display of the client apparatus, in a case where the information concerning the action mode is acquired by the client apparatus.

3. The apparatus according to claim 1, wherein the received job is at least one of a printing job causing the printing apparatus to print, the setting job for setting the action mode to the printing apparatus and the setting acquisition job for acquiring the information concerning the action mode.

4. The apparatus according to claim 3, at least one processor sets the action mode based on the setting job to the printing apparatus in a case where the setting job is received.

5. The apparatus according to claim 1, wherein the information concerning the action mode includes at least one of information on an automatic power-on setting of automatically powering on the printing apparatus when a job is input to the printing apparatus, information on an automatic power-off setting of automatically powering off the printing apparatus when it is unused for a predetermined time, information on an ink saving setting for saving inks used for printing at the printing apparatus and information on a setting of an ink cartridge used for printing at the printing apparatus.

6. The information processing apparatus according to claim 1, wherein at least one processor stores, in the first storage portion and the second storage portion, the information relating to the action mode in response to receipt of the setting job from the client apparatus.

7. The information processing apparatus according to claim 1, wherein at least one processor stores the information relating to the action mode in the second storage portion in response to receipt of the setting job from the client apparatus and stores the information relating to the action mode in the first storage potion in response to receipt of the setting acquisition job from the client apparatus.

8. The information processing apparatus according to claim 1, wherein at least one processor acquires the information relating to the action mode from the printing apparatus, and
   wherein at least one processor stores, in the first storage portion, the information relating to the action mode acquired from the printing apparatus in response to receipt of the setting acquisition job from the client apparatus if the information relating to the action mode can be acquired from the printing apparatus, and
   wherein at least one processor stores, in the first storage portion and in response to receipt of the setting acquisition job from the client apparatus, the information relating to the action mode having been stored in the second storage portion in response to receipt of the setting job from the client apparatus, if the information relating to the action mode cannot be acquired from the printing apparatus.

9. The information processing apparatus according to claim 1, wherein at least one processor stores, in the second storage portion, information relating to another action mode different from the action in response to receipt of the setting job with regard to the another action mode from the client apparatus, and
   wherein at least one processor acquired the information relating to the another action mode from the printing apparatus, and
   wherein at least one processor stores, in the first storage portion, the information relating to the another action mode acquired from the printing apparatus in response to receipt of the setting acquisition job with regard to the another action mode from the client apparatus if the information relating to the another action mode can be acquired from the printing apparatus, and
   wherein at least one processor stores, in the first storage portion and in response to receipt of the setting acquisition job with regard to the another action mode from the client apparatus, the information relating to the another action mode having been stored in the second storage portion in response to receipt of the setting job with regard to the another action mode from the client apparatus, if the information relating to the another action mode cannot be acquired from the printing apparatus, and wherein, when the setting acquisition job with regard to the action mode is received from the client apparatus, the information relating to the action mode having been stored in the first storage portion in response to receipt of the setting job with regard to the action mode from the client apparatus is acquired by the client apparatus, and wherein, when the setting acquisition job with regard to the another action mode is received from the client apparatus and when at least one processor is able to acquire the information relating to the another action mode, the information relating to the another action mode, which is stored in the first storage portion and is acquired from the printing apparatus, is acquired by the client apparatus, and wherein, when the setting acquisition job with regard to the another action mode is received from the client apparatus and when at least one processor is not able to acquire the information relating to the another action mode, the information relating to the another action mode, which is stored in the first storage portion and is stored in the second storage portion in response to receipt of the setting job with regard to the another action mode from the client apparatus, is acquired by the client apparatus.

10. The information processing apparatus according to claim 9, wherein the information relating to the action mode is information on an ink saving setting for saving inks used for printing at the printing apparatus or information on a setting of an ink cartridge used for printing at the printing apparatus, and wherein the information relating to the another action mode is information on an automatic power-on setting of automatically powering on the printing apparatus when a job is input to the printing apparatus or information on an automatic power-off setting of automatically powering off the printing apparatus when it is unused for a predetermined time.

11. An information processing method of controlling an information processing apparatus comprising at least one processor configured to receive a job sent from a client apparatus, the method comprising:

storing by the at least one processor information in a first storage portion and a second storage portion, the first storage portion holding information to be acquired, when the job is received, by the client apparatus which has sent the received job and the second storage portion holding information which (i) is not to be acquired, when the job is received, by the client apparatus which has sent the received job and (ii) is to be acquired, only when a printing apparatus connected to the information processing apparatus is registered by the client apparatus, by the client apparatus which has registered the printing apparatus; and storing by the at least one processor, in the first storage portion and the second storage portion, information relating to an action mode set based on a setting job for setting an action mode of the printing apparatus, the setting job being received from the client apparatus, wherein, when a setting acquisition job is received from another client apparatus different from the client apparatus after the setting job is received from the client apparatus, information held in the first storage portion and relating to the action mode set based on the setting job received from the client apparatus is acquired by the another client apparatus.

12. The method according to claim 11, wherein the information concerning the action mode includes at least one of information on an automatic power-on setting of automatically powering on the printing apparatus when a job is input to the printing apparatus, information on an automatic power-off setting of automatically powering off the printing apparatus when it is unused for a predetermined time, information on an ink saving setting for saving inks used for printing at the printing apparatus and information on a setting of an ink cartridge used for printing at the printing apparatus.

13. The method of according to claim 11, wherein a screen including the information concerning the action mode is displayed on a display of the client apparatus, in a case when the information concerning the action mode is acquired by the client apparatus.

14. The method according to claim 11,
wherein the job that is issued by the client apparatus is at least one of a printing job causing the printing apparatus to print, the setting job for setting the action mode of the printing apparatus and the setting acquisition job for acquiring the information concerning the action mode.

15. The information processing method according to claim 11, wherein at least one processor stores, in the first storage portion and the second storage portion, the information relating to the action mode in response to receipt of the setting job from the client apparatus.

16. The information processing method according to claim 11, wherein at least one processor stores the information relating to the action mode in the second storage portion in response to receipt of the setting job from the client apparatus and stores the information relating to the action mode in the first storage portion in response to receipt of the setting acquisition job from the client apparatus.

17. The information processing method according to claim 11, wherein at least one processor acquires the information relating to the action mode from the printing apparatus, and wherein at least one processor stores, in the first storage portion, the information relating to the action mode acquired from the printing apparatus in response to receipt of the setting acquisition job from the client apparatus if the information relating to the action mode can be acquired from the printing apparatus, and wherein at least one processor stores, in the first storage portion and in response to receipt of the setting acquisition job from the client apparatus, the information relating to the action mode having been stored in the second storage portion in response to receipt of the setting job from the client apparatus, if the information relating to the action mode cannot be acquired from the printing apparatus.

18. The information processing method according to claim 11, wherein at least one processor stores, in the second storage portion, information relating to another action mode different from the action mode in response to receipt of the setting job with regard to the anther action mode from the client apparatus, and wherein at least one processor acquires the information relating to the another action mode from the printing apparatus, and wherein at least one processor store, in the first storage portion, the information relating to the another action mode acquired from the printing apparatus in response to receipt of the setting acquisition job with regard to the another action mode from the client apparatus if the information relating to the another action mode can be acquired from the printing apparatus, and wherein at least one processor stores, in the first storage portion and in response to receipt of the setting acquisition job with regard to the another action mode from the client apparatus, the information relating to the another action mode having been stored in the second storage portion in response to receipt of the setting job with regard to the another action mode from the client apparatus, if the information relating to the another action mode cannot be acquired from the printing apparatus, and wherein, when the setting acquisition job with regard to the action mode is received from the client apparatus, the information relating to the action mode having been stored in the first storage portion in response to receipt of the setting job with regard to the action mode from the client apparatus is acquired by the client apparatus, and wherein, when the setting acquisition job with regard to the another action mode is received from the client apparatus and when at least one processor is able to acquire the information relating to the another action mode, the information relating to the another action mode, which is stored in the first storage portion and is acquired from the printing apparatus, is acquired by the client apparatus, and wherein, when the setting acquisition job with regard to the another action mode is received from the client apparatus and when at least one processor is not able to acquire the information relating to the another action mode, the information relating to the another action mode, which is stored in the first storage portion and is stored in the second storage portion in response to receipt of the setting job with regard to the another action mode from the client apparatus, is acquired by the client apparatus.

19. The information processing method according to claim 18, wherein the information relating to the action mode is information on an ink saving setting for saving inks used for printing at the printing apparatus or information on a setting of an ink cartridge used for printing at the printing apparatus, and wherein the information relating to the another action mode is information on an automatic power-on setting of automatically powering on the printing apparatus when a job is input to the printing apparatus or information on an automatic power-off setting of automatically powering off the printing apparatus when it is unused for a predetermined time.

20. A computer-readable storage medium storing medium storing a program that causes a computer perform an information processing method of information processing apparatus, the method comprising:

storing by the at least one processor information in a first storage portion and a second storage portion, the first storage portion holding information to be acquired, when the job is received, by the client apparatus which has sent the received job and the second storage portion holding information which (i) is not to be acquired, when the job is received, by the client apparatus which has sent the received job and (ii) is to be acquired, only when a printing apparatus connected to the information processing apparatus is registered by the client apparatus, by the client apparatus which has registered the printing apparatus; and storing by the at least one processor, in the first storage portion and the second storage portion, information relating to an action mode set based on a setting job for setting an action mode of the printing apparatus, the setting job being received from the client apparatus, wherein, when a setting acquisition job is received from another client apparatus different from the client apparatus after the setting job is received from the client apparatus, information held in the first storage portion and relating to the action mode set based on the setting job received from the client apparatus is acquired by the another client apparatus.

* * * * *